(12) United States Patent
Liu et al.

(10) Patent No.: US 12,233,340 B2
(45) Date of Patent: Feb. 25, 2025

(54) METHOD AND APPARATUS FOR CONTROLLING VIRTUAL CHARACTER IN VIRTUAL ENVIRONMENT, DEVICE, AND MEDIUM

(71) Applicant: TENCENT TECHNOLOGY (SHENZHEN) COMPANY LIMITED, Guangdong (CN)

(72) Inventors: Zhihong Liu, Guangdong (CN); Chang Guo, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 283 days.

(21) Appl. No.: 17/675,637

(22) Filed: Feb. 18, 2022

(65) Prior Publication Data

US 2022/0168646 A1    Jun. 2, 2022

Related U.S. Application Data

(63) Continuation of application No. PCT/CN2020/127797, filed on Nov. 10, 2020.

(30) Foreign Application Priority Data

Jan. 20, 2020 (CN) .......................... 202010065208.7

(51) Int. Cl.
*A63F 13/57* (2014.01)
(52) U.S. Cl.
CPC .................................... *A63F 13/57* (2014.09)
(58) Field of Classification Search
CPC .......... A63F 13/57; A63F 13/56; A63F 13/58; A63F 2300/64

(Continued)

(56) References Cited

U.S. PATENT DOCUMENTS

| 6,267,673 B1 | 7/2001 | Miyamoto et al. |
| 9,993,731 B2 * | 6/2018 | Iguchi ..................... A63F 13/35 |

(Continued)

FOREIGN PATENT DOCUMENTS

| CN | 104040585 A | 9/2014 |
| CN | 108245887 A | 7/2018 |

(Continued)

OTHER PUBLICATIONS

"Wikipedia—Terraria", https://en.wikipedia.org/wiki/Terraria (Year: 2011).*

(Continued)

*Primary Examiner* — Allen Chan
(74) *Attorney, Agent, or Firm* — ArentFox Schiff LLP

(57) ABSTRACT

Embodiments of this disclosure include an information processing method. In the method, a picture of a virtual environment is displayed. The picture includes a target region located in the virtual environment where the target region is adjacent to a neighboring region in the virtual environment. In response to a first movement instruction, a virtual character is controlled to enter the target region from the neighboring region by processing circuitry of an information processing apparatus. A first movement speed of the virtual character in the neighboring region is higher than a second movement speed of the virtual character in the target region. The information processing apparatus and non-transitory computer-readable storage medium counterpart embodiments are also contemplated.

20 Claims, 11 Drawing Sheets

(58) Field of Classification Search
USPC .......................................................... 463/31
See application file for complete search history.

(56) References Cited

U.S. PATENT DOCUMENTS

| | | | |
|---|---|---|---|
| 10,500,492 B2* | 12/2019 | Sato | A63F 13/837 |
| 2011/0294574 A1 | 12/2011 | Yamada et al. | |
| 2012/0202595 A1 | 8/2012 | Shioda et al. | |
| 2015/0355711 A1* | 12/2015 | Rihn | G06F 3/04815 340/407.2 |
| 2018/0357831 A1 | 12/2018 | Takayama et al. | |
| 2020/0148254 A1* | 5/2020 | Magrath, III | A63G 33/00 |

FOREIGN PATENT DOCUMENTS

| | | |
|---|---|---|
| CN | 108983969 A | 12/2018 |
| CN | 109116973 A | 1/2019 |
| CN | 109364475 A | 2/2019 |
| CN | 110507993 A | 11/2019 |
| CN | 110613938 A | 12/2019 |
| CN | 111298440 A | 6/2020 |
| JP | 2000200362 A | 7/2000 |
| JP | 2011245015 A | 12/2011 |
| JP | 2012234441 A | 11/2012 |
| KR | 20150095999 A | 8/2015 |

OTHER PUBLICATIONS

"Terraria Wiki—Swimming", https://terraria.fandom.com/wiki/Swimming (Year: 2011).*
"Terraria Wiki—Movement speed", https://terraria.fandom.com/wiki/Movement_speed (Year: 2011).*
"Terraria Wiki—Breath meter", https://terraria.fandom.com/wiki/Breath_meter (Year: 2011).*
"Terraria Wiki—Drowning", https://terraria.fandom.com/wiki/Drowning (Year: 2011).*
"Terraria Wiki—AI", https://terraria.fandom.com/wiki/AI (Year: 2011).*
Google search results for "virtual character sinking water game" (Year: 2024).*
International Search Report and Written Opinion for PCT/CN2020/127797, issued Feb. 10, 2021, 13 pages, English translation included.
Chinese Office Action issued Jan. 14, 2021 in Application No. 202010065208.7 with English Translation.
I Am Dijialan, "Game: Hatsune Miku in the Swamp", https://www.bilibili.com/video/av45659459, Mar. 8, 2019, Video 0:48AM-02:15.
Japanese Office Action issued Apr. 17, 2023 in Application No. 2022-521474, pp. 1-10.
Supplementary European Search Report issued Nov. 3, 2022 in Application No. 20915219.8, pp. 1-91.
Totilo Stephen: "Sink Or Swim? The Game Designer's Conundrum", Jul. 2, 2009 (Jul. 2, 2009), Retrieved from the Internet: URL:https://kotaku.com/sink-or-swim-the-game-designers-conundrum-5306343.
Korean Office Action issued Feb. 16, 2024 in Application No. 10-2022-7003812, pp. 1-32.
Arc, Season 2—Part 8 of the Potions related items, https://m.blog.naver.com/too3892/220751240840, Jul. 1, 2016, pp. 1-9.
Lifeisforu, [UT analysis] 5.4. movement mode and attribute, internet teeth spool of thread posted writing, https://lifeisforu.tistory.com/332, Jun. 26, 2016, pp. 1-20.
Lifeisforu, about the UE4 Brush, BSP, and the PhysX Convex, Internet teeth spool of thread posted writing, https://lifeisforutistory.com/361, Apr. 2, 2017, pp. 1-12.
Written Opinion received for Singapore Patent Application No. 11202202857V, mailed on Oct. 31, 2024, 7 pages.

* cited by examiner

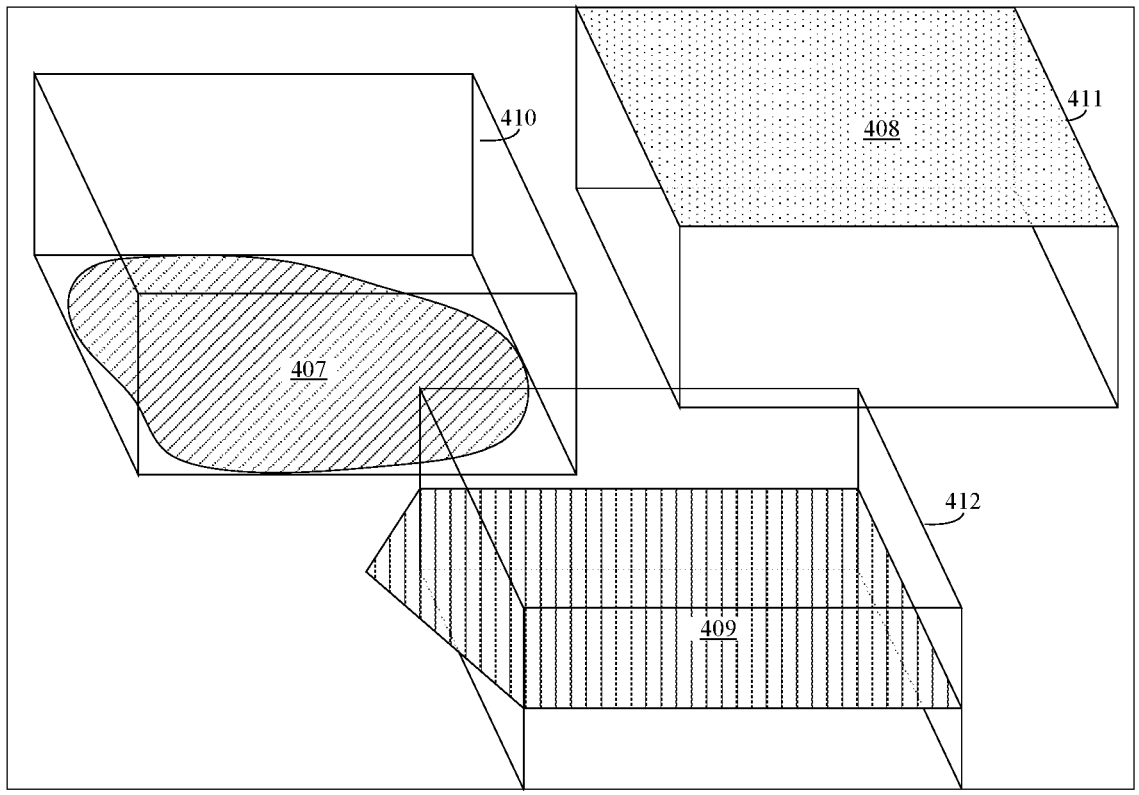

FIG. 7

Display a first picture, the first picture being a picture of observing a virtual environment at a perspective of a target virtual character, and the first picture including a target region located in the virtual environment — 101

Control, in response to a first movement instruction, the target virtual character to enter the target region — 102

Control, in response to that the target virtual character is located in the target region and the target virtual character has not moved in a reference time interval, the 3D model of the target virtual character to gradually descend in a vertical direction in the target region — 1031-1

FIG. 8

METHOD AND APPARATUS FOR CONTROLLING VIRTUAL CHARACTER IN VIRTUAL ENVIRONMENT, DEVICE, AND MEDIUM

RELATED APPLICATIONS

This application is a continuation of International Application No. PCT/CN2020/127797, entitled "Method and apparatus for controlling virtual character in virtual environment, device, and medium" and filed on Nov. 10, 2020, which claims priority to Chinese Patent Application No. 202010065208.7, entitled "Method and apparatus for controlling virtual character in virtual environment, device, and medium" and filed on Jan. 20, 2020. The entire disclosures of the prior applications are hereby incorporated by reference in their entirety.

FIELD OF THE TECHNOLOGY

Embodiments of this application relate to the field of computer technologies, including a method and an apparatus for controlling a virtual character in a virtual environment, a device, and a medium.

BACKGROUND OF THE DISCLOSURE

In an application based on a three-dimensional (3D) virtual environment, such as a first-person shooting game, a user may control a virtual character in the virtual environment to perform actions such as walking, running, climbing, shooting, and combat, and a plurality of users can form a team online to collaboratively complete a task in the same virtual environment.

In related art, the virtual environment includes a plurality of terrains such as a grassland, a mountain land, a desert, and a swamp, and the virtual character can perform activities in the virtual environment. In related art, by rendering different terrains in different colors or patterns (for example, rendering a desert in yellow, and rendering a lawn in green), a user can see the different terrains.

In related art, a terrain in a real world is simulated only through rendering in display, and the user can perceive display features of the terrain only from a rendering effect, but cannot experience real characteristics of the terrain. As a result, simulation reality of the terrain in the virtual environment is relatively poor, and consequently the interaction rate is relatively low.

SUMMARY

Embodiments of this disclosure include an information processing method and an information processing apparatus for controlling a virtual character in a virtual environment, a device, and a non-transitory computer-readable storage medium, for example, to simulate characteristics of a terrain realistically and increase an interaction rate, for example, with a user.

An aspect of the embodiments of this disclosure provides an information processing method, for example, to control a virtual character in a virtual environment. In the method, a picture of a virtual environment is displayed. The picture includes a target region located in the virtual environment where the target region is adjacent to a neighboring region in the virtual environment. In response to a first movement instruction, a virtual character is controlled to enter the target region from the neighboring region by processing circuitry of an information processing apparatus. A first movement speed of the virtual character in the neighboring region is higher than a second movement speed of the virtual character in the target region. The information processing apparatus and non-transitory computer-readable storage medium counterpart embodiments are also contemplated.

An aspect of the embodiments of this disclosure provides an information processing apparatus, for example, to control a virtual character in a virtual environment. The information processing apparatus includes processing circuitry configured to display a picture of a virtual environment. The picture further includes a target region located in the virtual environment where the target region is adjacent to a neighboring region in the virtual environment. In response to a first movement instruction, the processing circuitry is configured to control a virtual character to enter the target region from the neighboring region. A first movement speed of the virtual character in the neighboring region is higher than a second movement speed of the virtual character in the target region.

An aspect of this disclosure provides a computer device, including a processor and a memory, the memory storing at least one instruction, at least one program, a code set, or an instruction set, the at least one instruction, the at least one program, the code set, or the instruction set being loaded and executed by the processor to implement the method according to the embodiments of this disclosure.

An aspect of this disclosure provides a non-transitory computer-readable storage medium, storing instructions which when executed by at least one processor cause the at least one processor to perform the method according to the embodiments of this disclosure.

An aspect of this disclosure provides a computer program product storing at least one instruction, at least one program, a code set, or an instruction set, the at least one instruction, the at least one program, the code set, or the instruction set being loaded and executed by a processor to implement the method according to the embodiments of this disclosure.

The technical solutions provided in the embodiments of this disclosure include at least the following beneficial effects.

By controlling, after a virtual character (e.g., a target virtual character) moves to a target region, the target virtual character to sink in the target region and/or to move at a lower movement speed, to simulate a feature that a natural terrain such as swamp or quicksand sinks and/or reduces a movement speed of the virtual character, a user not only can see a difference between the swamp or quicksand terrain and an ordinary ground in a first picture, but also can experience, in a process of controlling an activity of the virtual character, effects of characteristics of different terrains on a movement manner from an effect of the swamp or quicksand terrain on the virtual character in the movement manner, so that simulation reality of a terrain in a virtual environment is relatively high, thereby facilitating an increase in an interaction rate.

BRIEF DESCRIPTION OF THE DRAWINGS

To describe the technical solutions in the embodiments of this disclosure more clearly, the accompanying drawings used for describing the embodiments are briefly described hereinafter. The accompanying drawings in the following descriptions show some embodiments of this disclosure, and a person of ordinary skill in the art may obtain other accompanying drawings according to these accompanying drawings.

FIG. 7 is a schematic diagram of a virtual environment during implementation of a method for controlling a virtual character in a virtual environment according to another exemplary embodiment of this disclosure.

FIG. 8 is a method flowchart of a method for controlling a virtual character in a virtual environment according to another exemplary embodiment of this disclosure.

DESCRIPTION OF EMBODIMENTS

Figure 1:
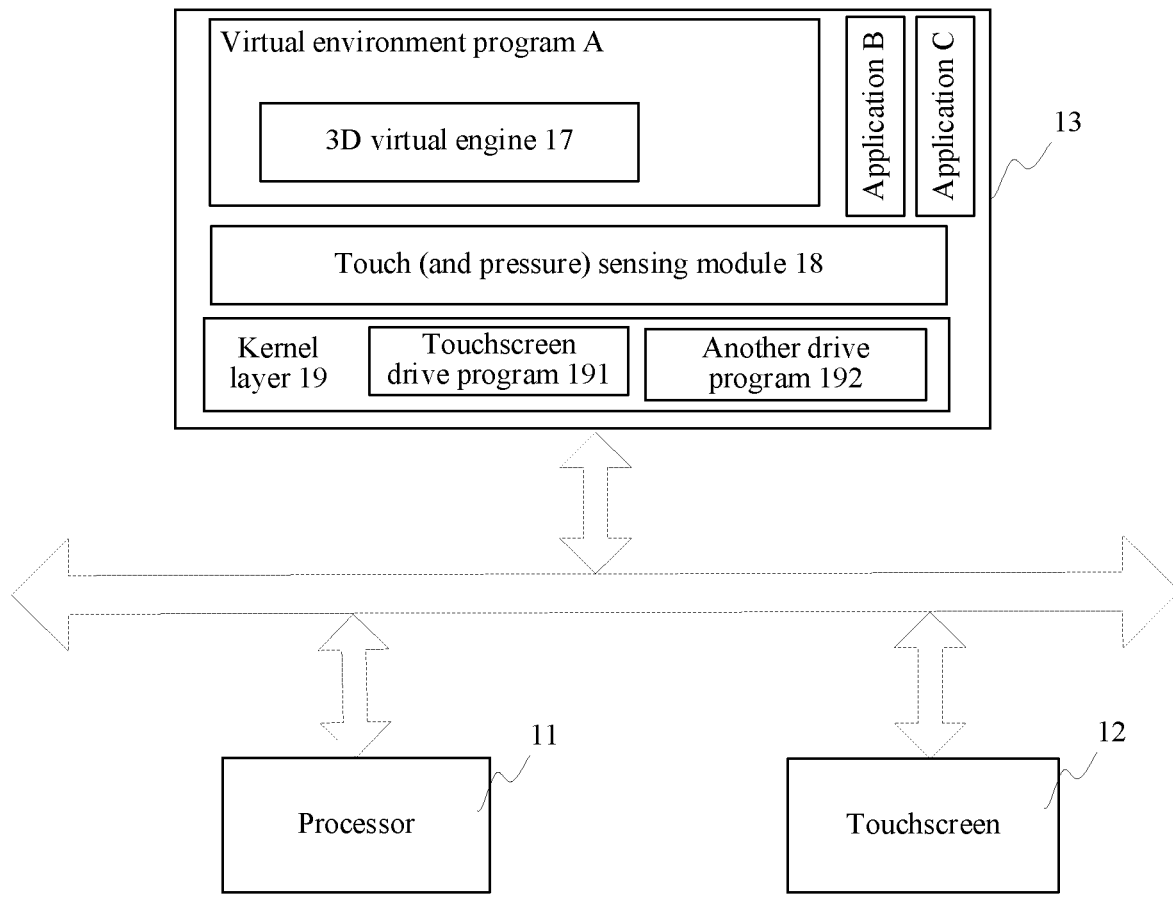
FIG. 1 is a schematic structural diagram of a terminal according to an exemplary embodiment of this disclosure.

To make the objectives, technical solutions, and advantages of this disclosure clearer, the following further describes implementations of this disclosure in detail with reference to the accompanying drawings.

Terms involved in the embodiments of this disclosure are briefly introduced.

Virtual environment: a virtual environment displayed (or provided) by an application when run on a terminal. The virtual environment is a simulated world of a real world, or a semi-simulated semi-fictional world, or an entirely fictional world. The virtual environment is any one of a two-dimensional (2D) virtual environment, a 2.5D virtual environment, or a 3D virtual environment. This is not limited in this disclosure. A description is made by using an example in which the virtual environment is a 3D virtual environment in the following embodiments.

A virtual character is a movable object in a virtual environment. For example, the movable object is a virtual character, a virtual animal, a cartoon character, or the like, such as a character, an animal, a plant, an oil drum, a wall, or a stone displayed in a 3D virtual environment. In some embodiments, the virtual character is a 3D model created based on a skeletal animation technology. In an example, the 3D model represents the virtual character. Each virtual character has a respective shape and size in the 3D virtual environment, and occupies some space in the 3D virtual environment.

A target region is a region in a virtual environment. For example, the target region is a region located on a ground or water surface in the virtual environment. For example, the target region and the ordinary ground are displayed differently in a virtual environment. For example, the ordinary ground is khaki, and the target region is dark brown or blue. For example, the target region is at least one of swamp, quicksand, black hole, vortex, or undercurrent. For example, the movement speed of the virtual character decreases in the target region. For example, after entering the target region, the virtual character needs to keep moving, and once the virtual character has stopped moving for a period of time, the virtual character sinks or/and is subjected to damage.

A user interface (UI) control is any visual control or element that can be seen in a UI of an application, for example, a control such as a picture, an input box, a text box, a button, or a label. Some UI controls can respond to an operation of a user, for example, a movement control, which controls a virtual character to perform a movement action in a virtual environment. The user triggers the movement control, to control advancing, retreating, leftward or rightward movement, climbing, swimming, jumping, or the like of the virtual character. UI controls involved in the embodiments of this disclosure include, but are not limited to: a movement control and a jumping control.

A method provided in this disclosure can be applied to an electronic device in which an application supporting a virtual environment and a virtual character is installed. In some embodiments, the electronic device is further referred to as a terminal. For example, the application supporting a virtual environment is an application in which the user can control a virtual character to move in the virtual environment. For example, the method provided in this disclosure can be applied to: any one of a virtual reality (VR) application, an augmented reality (AR) program, a 3D map program, a military simulation program, a VR game, an AR game, a first-person shooting (FPS) game, a third-person shooting (TPS) game, a Multiplayer Online Battle Arena (MOBA) game, or a simulation game (SLG).

For example, a virtual environment includes maps of one or more game worlds. The virtual environment in the game simulates scenes in the real world. A user may control a virtual character in the game to perform actions in the virtual environment such as walking, running, jumping, shooting, combating, driving, using a virtual weapon to attack another virtual character, and using a virtual weapon to make a charge attack on another virtual character, which has relatively high interactivity. In addition, a plurality of users may form a team online to perform an arena game.

In some embodiments, the foregoing application is a program such as shooting game, a racing game, a role-playing game, an adventure game, a sandbox game, a battle arena game, or a military simulation program. The foregoing application may support at least one operating system of a Windows operating system, an Apple operating system, an Android operating system, an iOS operating system, or a LINUX operating system, and applications on different operating systems may be connected to and communicate with each other. In some embodiments, the foregoing application is a program adapted to a mobile terminal having a touchscreen.

In some embodiments, the foregoing application is an application developed based on a 3D engine. For example, the 3D engine is a Unity engine.

A terminal in this disclosure is a desktop computer, a portable laptop computer, a mobile phone, a tablet computer, an e-book reader, a Moving Picture Experts Group Audio Layer III (MP3) player, a Moving Picture Experts Group Audio Layer IV (MP4) player, or the like. An application supporting a virtual environment such as an application supporting a 3D virtual environment is installed and run on the terminal. For example, the application is any one of a battle royale (BR) game, a VR application, an AR program, a 3D map program, a military simulation program, a TPS game, an FPS game, or a MOBA game. The application can be a standalone application, such as a standalone 3D game program, or is a network online application.

FIG. 1 is a schematic structural diagram of a terminal according to an exemplary embodiment of this disclosure. As shown in FIG. 1, the terminal includes a processor 11, a touchscreen 12, and a memory 13.

For example, the processor 11 is at least one of a single-core processor, a multi-core processor, an embedded chip, and a processor having an instruction running capability.

The touchscreen 12 includes an ordinary touchscreen or a pressure-sensitive touchscreen. The ordinary touchscreen can measure a press operation or slide operation applied to the touchscreen 12; and the pressure-sensitive touchscreen may measure a pressure applied to the touchscreen 12.

The memory 13 stores programs executable by the processor 11. For example, the memory 13 stores a virtual environment program A, an application B, an application C, a touch (and pressure) sensing module 18, and a kernel layer 19 of an operating system. The virtual environment program A is an application developed based on a 3D virtual engine 17. The virtual environment program A includes, but is not limited to at least one of a game program, a virtual reality (VR) program, a 3D map program, or a 3D demonstration program developed by the 3D virtual engine (also referred to as a virtual environment engine) 17. For example, in a case that an operating system of the terminal is an Android operating system, the virtual environment program A is developed by using Java programming language and C#language. In another example, in a case that an operating system of the terminal is an iOS operating system, the virtual environment program A is developed by using Object-C programming language and C#language.

The 3D virtual engine 17 is a 3D interactive engine supporting a plurality of operating system platforms. For example, the 3D virtual engine may be applied to program development in a plurality of fields such as the game development field, the VR field, and the 3D map field. A specific type of the 3D virtual engine 17 is not limited in this embodiment of this disclosure. An example in which the 3D virtual engine 17 is a Unity engine is used in the following embodiment for description.

The touch (and pressure) sensing module 18 is a module configured to receive a touch event (and a pressure touch event) reported by a touchscreen drive program 191. In some embodiments, the touch sensing module does not have a pressure sensing function, and does not receive a pressure touch event. The touch event includes a type and coordinate values of the touch event. The type of the touch event includes, but is not limited to a touch start event, a touch moving event, and a touch drop event. The pressure touch event includes a pressure value and coordinate values of the pressure touch event. The coordinate values of the pressure touch event are used for indicating a touch location of a pressure touch operation on a display screen. In some embodiments, a transverse coordinate axis is established in a horizontal direction of the display screen and a longitudinal coordinate axis is established in a vertical direction of the display screen, to obtain a 2D coordinate system. The coordinate values of the pressure touch event are determined based on the 2D coordinate system.

For example, the kernel layer 19 includes the touchscreen drive program 191 and another drive program 192. The touchscreen drive program 191 is a module configured to detect a pressure touch event. When detecting the pressure touch event, the touchscreen drive program 191 transfers the pressure touch event to the touch (and pressure) sensing module 18.

For example, the another drive program 192 is a drive program related to the processor 11, a drive program related to the memory 13, a drive program related to a network component, a drive program related to a sound component, or the like.

A person skilled in the art may learn that the foregoing is only an overview of a structure of the terminal. In different embodiments, the terminal may have more or fewer components. For example, the terminal may further include a gravity acceleration sensor, a gyroscope sensor, a power supply, and the like.

Figure 2:
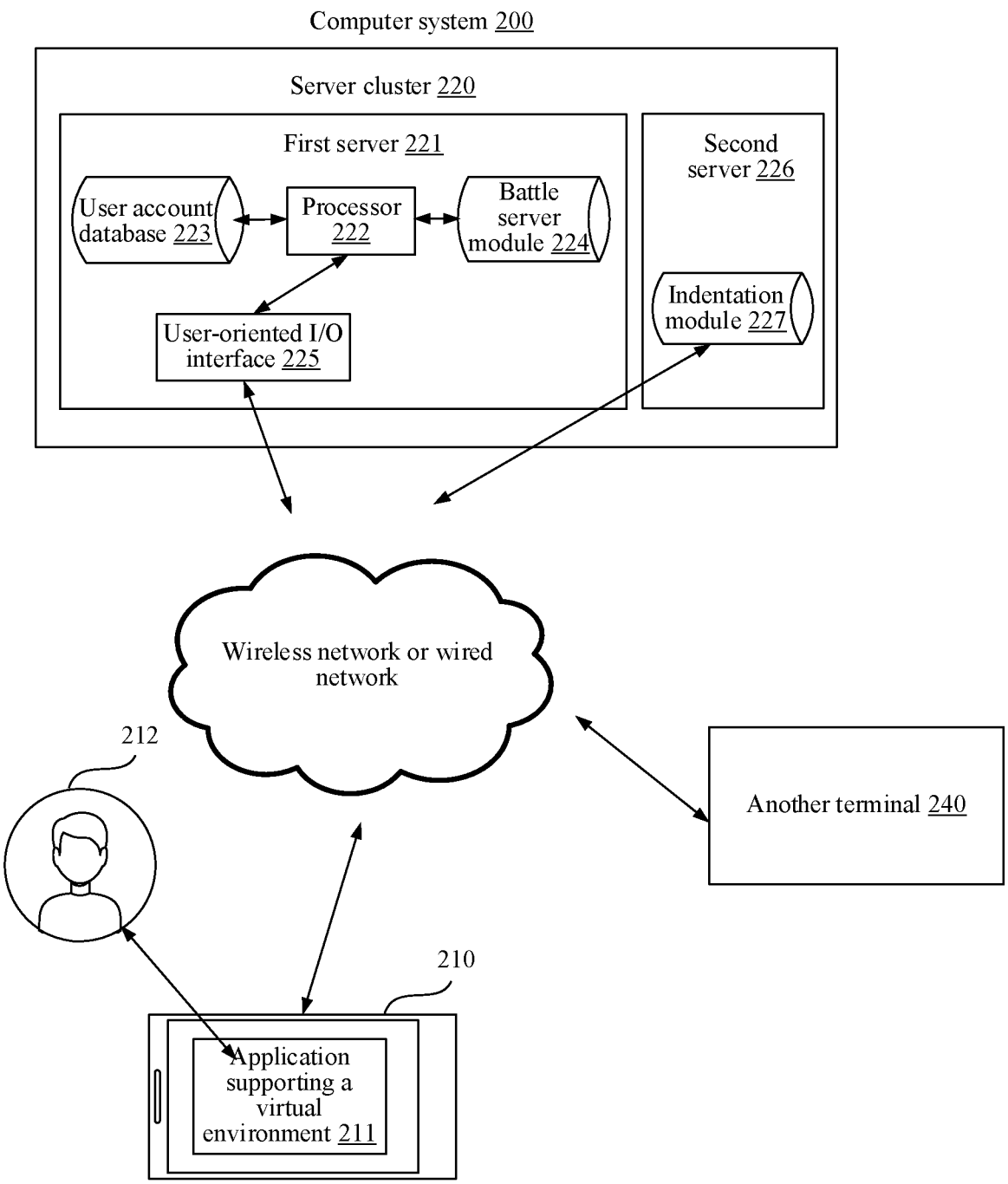
FIG. 2 is a structural block diagram of a computer system according to an exemplary embodiment of this disclosure.

FIG. 2 is a structural block diagram of a computer system according to an exemplary embodiment of this disclosure. The computer system 200 includes a terminal 210 and a server cluster 220.

An application 211 supporting a virtual environment is installed and run on the terminal 210. When the terminal runs the application 211 supporting a virtual environment, a UI of the application 211 supporting a virtual environment is displayed on a screen of the terminal 210. For example, the application 211 supporting a virtual environment is any one of an FPS game, a TPS game, a military simulation program, a MOBA game, a battle arena game, or an SLG game. In an embodiment, a description is made by using an example in which the application 211 supporting a virtual environment is an FPS game. The terminal 210 is a terminal used by a first user 212. The first user 212 uses the terminal 210 to control a first virtual character located in the virtual environment to perform activities, and the first virtual character is referred to as a target virtual character of the first user 212. The activities of the first virtual character include, but are not limited to: at least one of adjusting body postures, crawling, walking, running, riding, jumping, driving, picking, shooting, attacking, and throwing. For example, the first virtual character is a simulated person character or a cartoon person character.

The device type of the terminal 210 includes at least one of a smartphone, a tablet computer, an e-book reader, a Moving Picture Experts Group Audio Layer III (MP3) player, a Moving Picture Experts Group Audio Layer IV (MP4) player, a laptop, or a desktop computer.

FIG. 2 shows one terminal. However, a plurality of other terminals 240 may access the server cluster 220 in different embodiments. In some embodiments, at least one other terminal 240 is a terminal corresponding to a developer. A developing and editing platform for the application supporting a virtual environment is installed on the terminal 240. The developer may edit and update the application supporting a virtual environment on the terminal 240 and may further transmit an updated installation package of the application supporting a virtual environment to the server cluster 220 by using a wired or wireless network. The terminal 210 may download the installation package of the application supporting a virtual environment from the server cluster 220 to update the application supporting a virtual environment.

The terminal 210 and the other terminal 240 are connected to the server cluster 220 by using the wireless network or wired network.

The server cluster 220 includes at least one of one server, a plurality of servers, a cloud computing platform, and a virtualization center. The server cluster 220 is configured to provide a backend service for an application supporting a virtual environment. For example, the server cluster 220 is responsible for primary computing work, and the terminal 210 is responsible for secondary computing work; or the server cluster 220 is responsible for secondary computing work, and the terminal 210 is responsible for primary computing work; or the server cluster 220 and the terminal 210 perform collaborative computing by using a distributed computing architecture between each other.

In some embodiments, the terminal 210 and the server cluster 220 are computer devices.

In a schematic example, the server cluster 220 includes a first server 221 and a second server 226. The first server 221 includes a processor 222, a user account database 223, a battle service module 224, and a user-oriented input/output (I/O) interface 225. The processor 222 is configured to load instructions stored in the first server 221, and process data in the user account database 223 and the battle service module 224. The user account database 223 is configured to store data of user accounts used by the terminal 210 and the another terminal 240, for example, avatars of the user accounts, nicknames of the user accounts, battle effectiveness indexes of the user accounts, and service zones of the user accounts. The battle service module 224 is configured to provide a plurality of battle rooms for the users to battle. The user-oriented I/O interface 225 is configured to establish communication with the terminal 210 by using the wireless network or wired network to exchange data. In an exemplary embodiment, the second server 226 includes an indentation module 227. The indentation module 227 is configured to establish communication with the terminal 210 by using the wireless network or wired network to exchange data.

The method for controlling a virtual character in a virtual environment provided by the embodiments of this disclosure is described with reference to the above description of the virtual environment and the description of an implementation environment. Descriptions are made by using an example in which the method is performed by the terminal shown in FIG. 1. An application is run on the terminal, and the application supports a virtual environment.

This disclosure provides an exemplary embodiment in which the method for controlling a virtual character in a virtual environment is applied to an FPS game. For example, the FPS game provides a hopping vampire mode. In the hopping vampire mode, hopping vampires controlled by artificial intelligence (AI) exist, the hopping vampires automatically chase a virtual character controlled by a user, and in some examples, the user may win a game victory only after the user controls the virtual character to elimination all the hopping vampires or to survive for a specific time in a virtual environment.

In the method for controlling a virtual character in a virtual environment provided in this disclosure, when the virtual character controlled by the user walks into a swamp land (or a swamp), a movement speed of the virtual character can be reduced in the swamp land, and the virtual character is to continue to move in the swamp land. If the virtual character has stayed at a place for a specific duration, the virtual character is affected by the swamp land to sink, and during the sinking, the swamp land further causes damage to the virtual character, to reduce a state value of the virtual character. For example, the virtual character can remove the sinking of the swamp land through jumping or in another manner, to cause the virtual character to return to a height before the sinking.

For example, the swamp land also affects the hopping vampires, and the swamp land similarly causes movement speeds of the hopping vampires to decrease. The virtual character in the game has a skill in disabling movement of the hopping vampires. After the hopping vampires have stayed in the swamp land for a specific duration, the hopping vampires are affected by the swamp land to automatically sink, and the sinking of the hopping vampires cannot be stopped until the hopping vampires die. Therefore, the user can kill the hopping vampires in such a manner of inducing the hopping vampires into the swamp land and casting the skill in disabling movement to the hopping vampires.

For example, a collision box is disposed on the swamp land, and information indicating that the virtual character enters and leaves the swamp land is obtained through the collision box. When a model of the virtual character or a hopping vampire collides with the collision box, the collision box returns collision information. The collision information includes: information about the virtual character or the hopping vampire, and information indicating that the virtual character or the hopping vampire enters/exits the collision box.

For example, the swamp land reduces the movement speed of the virtual character by setting a friction coefficient. When the virtual character is located in a swamp land, the movement speed of the virtual character is obtained by multiplying a normal movement speed by a friction coefficient corresponding to the swamp land. For example, swamp lands in different locations in the virtual environment correspond to different friction coefficients, that is, the virtual character is at different movement speeds in different swamp lands.

Figure 3:
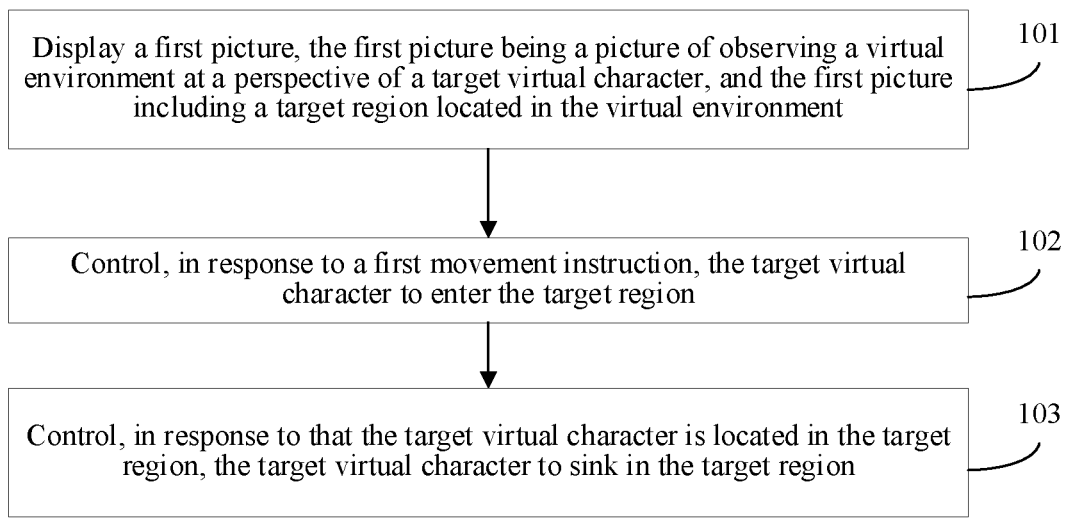
FIG. 3 is a method flowchart of a method for controlling a virtual character in a virtual environment according to an exemplary embodiment of this disclosure.

FIG. 3 is a method flowchart of a method for controlling a virtual character in a virtual environment according to an exemplary embodiment of this disclosure. A description is made by using an example in which the method is performed by the terminal shown in FIG. 1, an application supporting a virtual environment is run on the terminal, and the method includes at least the following steps.

In step 101, a first picture (or a picture) of a virtual environment can be displayed. The first picture can be a picture of the virtual environment observed from a perspective of a target virtual character or another virtual character. The first picture can be a picture of the virtual environment observed from a top perspective. The first picture can include a target region located in the virtual environment. The target region can be adjacent to a neighboring region in the virtual environment.

For example, the application displays a first user interface. The first user interface includes the first picture, and the first picture is a picture captured by observing the virtual environment at the perspective of the target virtual character.

In some embodiments, the first picture is a picture of observing the virtual environment at the perspective of the target virtual character. The perspective of the target virtual character refers to an observation angle at which observation is performed in the virtual environment from a first-person perspective or a third-person perspective of the target virtual character. In an embodiment of this disclosure, the perspective of the target virtual character is an angle for observing the target virtual character through a camera model in the virtual environment.

In some embodiments, the camera model automatically follows the virtual character in the virtual environment. That is, when a location of the virtual character in the virtual environment changes, a location of the camera model following the virtual character in the virtual environment changes simultaneously, and the camera model is within a reference distance range of the virtual character in the virtual environment. For example, in the automatic following process, a relative location between the camera model and the virtual character does not change.

The camera model is a 3D model located around the virtual character in the virtual environment; in a case of adopting a first-person perspective, the camera model is located around the head of the virtual character or located at the head of the virtual character. In a case of adopting a third-person perspective, the camera model may be located behind the virtual character and bound to the virtual character, and may also be located at any location away from the virtual character by a reference distance, and the virtual character located in the virtual environment can be observed from different angles by means of the camera model In an embodiment, in a case that the third-person perspective is an over-shoulder perspective of the first-person, the camera model is located behind the virtual character (e.g., the head and shoulder of the virtual character). In an embodiment, in addition to the first-person perspective and the third-person perspective, the perspective also includes other perspectives, such as a top perspective. When the top perspective is used, the camera model may be located above the head of the virtual character. The top perspective is a perspective for observing the virtual environment with an angle from the sky. In an embodiment, the camera model is not actually displayed in the virtual environment. In other words, the camera model is not displayed in the virtual environment displayed in the UI.

A description is made by using an example in which the camera model is located at any location away from the virtual character by a reference distance. In an example, the virtual character corresponds to one camera model, and the camera model may rotate with the virtual character as a rotation center. For example, the camera model is rotated with any point of the virtual character as a rotation center. During rotation, the camera model is not only rotated at an angle, but also displaced. During rotation, a distance between the camera model and the rotation center remains unchanged, that is, the camera model is rotated on a surface of a sphere with the rotation center as a sphere center. For example, any point of the virtual character may be the head or the torso of the virtual character, or any point around the virtual character. This is not limited in the embodiments of this disclosure. In an embodiment, when the virtual character is observed by using the camera model, the center direction of the perspective of the camera model is a direction in which a point of a spherical surface on which the camera model is located points to a sphere center.

In some embodiments, the virtual character may alternatively be observed by using the camera model at a reference angle in different directions of the virtual character.

Figure 4:
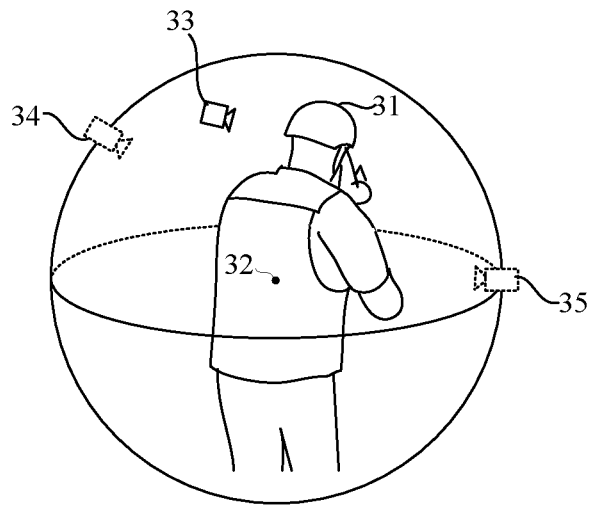
FIG. 4 is a schematic diagram of observing a target virtual character through a camera model according to an exemplary embodiment of this disclosure.

For example, referring to FIG. 4, a point in a target virtual character 31 is determined as a rotation center 32, and the camera model rotates around the rotation center 32. In an embodiment, the camera model is configured with an initial location, and the initial location is an upper rear location of the target virtual character (for example, a rear location of the brain). For example, as shown in FIG. 4, the initial location is a location 33, and when the camera model rotates to a location 34 or a location 35, a perspective direction of the camera model changes as the camera model rotates.

In some embodiments, the virtual environment displayed in the first picture includes at least one of the following elements: a mountain, a plain, a river, a lake, a sea, a desert, a swamp, quicksand, a sky, a plant, a building, or a vehicle.

The target region can have a hardness between that of a hard ground and that of a water surface. For example, the hardness can be distinguished through picture display. For example, when the virtual character is walking on a cement ground, no trace is left; when the virtual character is walking on a land or grassland, footprints are left; and when the virtual character is walking in water, the water surface is splashed with water, or ripples are generated on the water surface. For example, when the virtual character is walking on a cement ground, feet of the virtual character are located on the ground surface; when the virtual character is walking on a land or grassland, the ground surface on which the virtual character treads is depressed to a specific extent; and when the virtual character is walking in water, the feet of the virtual character are located below the ground surface (water surface), and the water surface submerges the trunk of the virtual character.

The target region is used for simulating a terrain in nature. For example, the target region is used for simulating at least one of a swamp, a quicksand land, or a vortex on the seabed. For example, the target region has a specific mobility such that the specific mobility is associated with the target region. For example, an inclined angle between the target region and the horizontal plane is less than an angle threshold. For example, the inclined angle between the target region and the horizontal plane is less than 60°. For example, the target region refers to a ground surface occupying a specific area in the virtual environment, and there is a specific depth under the target region, to enable the virtual character to sink in the target region.

Figure 5:
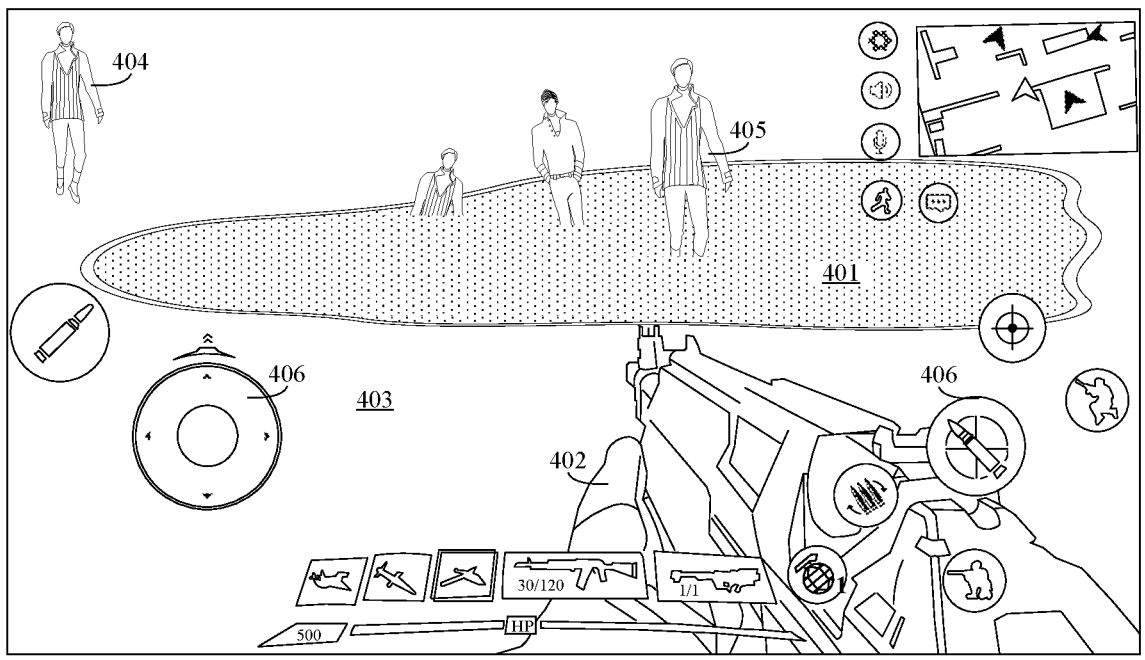
FIG. 5 is a schematic diagram of a first user interface of a method for controlling a virtual character in a virtual environment according to an exemplary embodiment of this disclosure.

For example, FIG. 5 is a schematic diagram of a first user interface provided in this embodiment. For example, the first user interface displays a first picture of a virtual environment, and a UI control 406 used for controlling a target virtual character. For example, when an application is run on a computer device with another input device, the first user interface does not display the UI control. For example, the first picture is a picture of observing the virtual environment at a first-person perspective of the target virtual character, and the first picture displays a hand 402 of the target virtual character. For example, the first picture includes a target region 401 and a ground 403, where the target region 401 is a shadow region, and the ground 403 is a white region. For example, there are virtual characters on the target region 401 and the ground 403. A first virtual character 404 walks on the ground 403, and feet of the first virtual character 404 are located above the ground surface; and a second virtual character 405 walks in the target region 401, and feet of the second virtual character 405 are located below the ground surface.

For example, the first picture is a picture of observing the virtual environment at a perspective of another virtual character. For example, as shown in FIG. 5, the first picture is a picture of observing the virtual environment at a perspective of a third virtual character. The first picture includes the target virtual character located in the virtual environment. For example, the first virtual character 404 is the target virtual character.

In step 102, in response to a first movement instruction, the virtual character (e.g., the target virtual character) is controlled to enter the target region, for example, from the neighboring region that is adjacent to the target region. A first movement speed of the virtual character in the neighboring region can be higher than a second movement speed of the virtual character in the target region.

In an example, the neighboring region is a region having an ordinary ground, and the target region is one of a swamp, a quicksand region, a black hole, a vortex, an undercurrent region, or the like that is different from the ordinary ground. In an example, the neighboring region is one of a swamp, a quicksand region, a black hole, a vortex, an undercurrent region, or the like that is different from the ordinary ground, and the target region is one of a swamp, a quicksand region, a black hole, a vortex, an undercurrent region, or the like that is different from the ordinary ground. In an embodiment, a movement speed of the virtual character in the swamp, the quicksand region, the black hole, the vortex, the undercurrent region, or the like that is different from the ordinary ground is slower than a movement speed of the virtual character on the ordinary ground. The virtual character can sink in the swamp, the quicksand region, the black hole, the vortex, the undercurrent region, or the like that is different from the ordinary ground. In an example, the virtual character does not sink on the ordinary ground. In an example, the neighboring region is a region having the ordinary ground, and the virtual character does not sink in the neighboring region.

The terminal controls, in response to the first movement instruction, the target virtual character to enter the target region.

For example, the first movement instruction is used for controlling the target virtual character to move. For example, the first movement instruction is generated after the user performs a movement operation; or the first movement instruction is an instruction used for controlling the target virtual character to move, sent by a server, and received by the terminal; or the first movement instruction is an instruction used for controlling the target virtual character to move and automatically generated by an application in the terminal. For example, the movement operation is an operation of the UI control on the first user interface triggered by the user; or the movement operation is inputted by the user through an input device, where the input device is, for example, a mouse, a keyboard, or a game joystick; or the movement operation is a user operation obtained by the terminal through recognition, for example, action recognition, a thermal sensing apparatus, gesture recognition, or speech recognition. For example, the first movement instruction is one instruction or a combination of a plurality of instructions.

For example, the first movement instruction is used for controlling the target virtual character to perform first movement. For example, the first movement is to control the target virtual character to move leftward by ten unit distances; or the first movement is to control the target virtual character to jump forward and then slide by three unit distances. For example, a unit distance is at least one of 1 check, 1 centimeter, 1 decimeter, or 1 meter. For example, after performing the first movement, the target virtual character can move to the target region; or the target virtual character can enter the target region during the first movement.

For example, that the virtual character enters the target region means that any part of the virtual character falls within a target region range; or the center of gravity/center of the virtual character falls within the target region range. For example, if location coordinates of the virtual character in the virtual environment are determined according to a point on the 3D model of the virtual character, that the virtual character enters the target region means that the point enters the target region range.

In step 103, in response to the target virtual character being located in the target region, the target virtual character can be controlled to sink in the target region.

The terminal controls, in response to the target virtual character being located in the target region, the target virtual character to sink in the target region.

For example, the virtual character is located in the target region means that the center of gravity/center of the virtual character is located in the target region; or that at least one point on the 3D model of the virtual character is located in the target region; or that feet of the virtual character are located in the target region; or that the 3D model of the virtual character is all located in the target region.

For example, after the target virtual character is located in the target region, the target virtual character being affected by the terrain (swamp or quicksand) of the target region sinks in the target region. The sinking means that the target virtual character gradually descends. For example, the sinking means that the target virtual character moves downward in the vertical direction. For example, the sinking is automatic sinking not controlled by the user. For example, the target virtual character can move in the horizontal direction during the sinking; or once beginning to sink, the target virtual character cannot move in the horizontal direction.

In conclusion, according to the method provided in this disclosure, by controlling, after a target virtual character moves to a target region, the target virtual character to sink in the target region, to simulate a feature that a natural terrain such as swamp or quicksand sinks, a user not only can see a difference between the swamp or quicksand terrain and an ordinary ground in a first picture, but also can experience, in a process of controlling an activity of the virtual character, effects of characteristics of different terrains on a movement manner from an effect of the swamp or quicksand terrain on the virtual character in the movement manner, so that simulation reality of a terrain in a virtual environment is relatively high, thereby facilitating an increase in an interaction rate.

For example, the virtual character located in the target region is further affected by other aspects. For example, an exemplary embodiment of determining that the target virtual character enters the target region is further provided.

Figure 6:
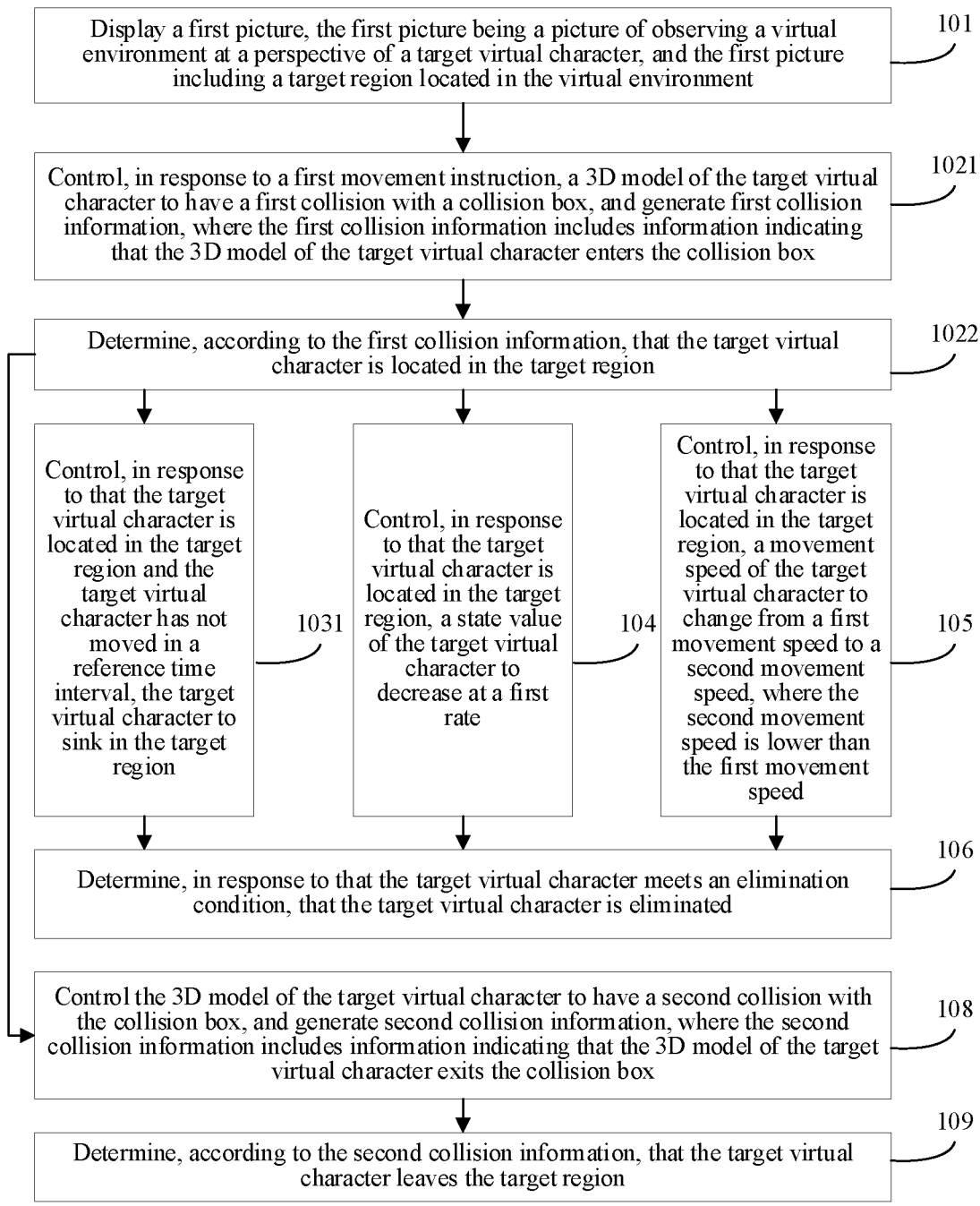
FIG. 6 is a method flowchart of a method for controlling a virtual character in a virtual environment according to another exemplary embodiment of this disclosure.

FIG. 6 is a method flowchart of a method for controlling a virtual character in a virtual environment according to an exemplary embodiment of this disclosure. A description is made by using an example in which the method is performed by the terminal shown in FIG. 1, an application supporting a virtual environment is run on the terminal, and the method includes at least the following steps.

In step 101, a first picture can be displayed. The first picture can be a picture of observing a virtual environment from a perspective of a virtual character (e.g., a target virtual character), and the first picture can include a target region located in the virtual environment.

In step 1021, in response to a first movement instruction, a 3D model of the target virtual character can be controlled to have a first collision with a collision box. First collision information can be generated where the first collision information includes information indicating that the 3D model of the target virtual character enters the collision box.

The terminal controls, in response to the first movement instruction, the 3D model of the target virtual character to have the first collision with the collision box, and generates the first collision information.

For example, the target region is provided with a collision box, and a distance between a bottom surface of the collision box and a horizontal plane in which the target region is located is less than a reference threshold. A process of controlling the target virtual character to enter the target region is implemented by controlling the 3D model of the target virtual character to have the first collision with the collision box and generating the first collision information.

The 3D model of the virtual character is created for the virtual character, and the 3D model of the virtual character has a specific size and volume. For example, the 3D model of the virtual character is at least one of a person model, an animal model, or another type of virtual character model that is simulated.

The collision box is a virtual model that is invisible on the user interface and that is disposed on the target region. For example, the shape of the collision box simulates the boundary of the target region, and if the shape and the size of the collision box are closer to the range of the target region, a result detected by the collision box is more real.

For example, the collision box is disposed above the target region, or the collision box is disposed below the target region, or the collision box is disposed both above the target region and below the target region. For example, using an example in which the target region is parallel to the horizontal plane, a lower surface (or a bottom surface) of the collision box is parallel to the horizontal plane or slightly higher than the horizontal plane; or an upper surface (or a top surface) of the collision box is parallel to the horizontal plane or slightly lower than the horizontal plane; or the collision box has an upper surface higher than the horizontal plane and a lower surface lower than the horizontal plane.

For example, as shown in FIG. 7, the virtual environment includes three target regions being a first target region 407, a second target region 408, and a third target region 409 respectively, and three collision boxes are disposed on the three target regions being a first collision box 410, a second collision box 411, and a third collision box 412 respectively. A lower surface of the first collision box 410 is parallel to a horizontal plane in which the first target region 407 is located, an upper surface of the second collision box 411 is parallel to a horizontal plane in which the second target region 408 is located, an upper surface of the third collision box 412 is located above a horizontal plane in which the third target region 409 is located, and a lower surface of the third collision box 412 is located below the horizontal plane in which the third target region 409 is located. For example, a collision box completely covers a target region, for example, the first collision box 410 or the second collision box 411; or a collision box incompletely covers a target region, for example, the third collision box 412.

For example, the size of the collision box covers all or most of the target region. For example, a same target region can be provided with a plurality of collision boxes, and the plurality of collision boxes do not cross (or overlap with) each other. For example, the collision box is in a shape that is regular and facilitates calculation or a combination of a plurality of shapes that are regular and facilitate calculation, to make calculation convenient. For example, the collision box is a cuboid, a cube, a cylinder, a sphere, or a cone.

The collision box is used for detecting a collision between another virtual model in the virtual environment and the collision box. For example, when another virtual model in the virtual environment collides with the collision box, the collision box can obtain information about the virtual model, a collision point, a collision direction, and the like. For example, the collision box determines whether a collision occurs by detecting whether the collision box intersects another virtual model. For example, after entering the target region, the target virtual character collides with the collision box disposed on the target region, to generate first collision information, where the first collision information includes at least one of information indicating that the 3D model of the target virtual character enters the collision box, a collision point, an identifier of the target virtual character, a location of the target virtual character, a type of the target virtual character, or a state attribute of the target virtual character. For example, the first collision information is used for determining that the target virtual character enters the target region. For example, when the terminal obtains, from the first collision information, the information indicating that the 3D model of the target virtual character enters the collision box, it is determined that the target virtual character enters the collision box. For example, the first collision information is generated after any point on the 3D model of the target virtual character collides with the collision box.

For example, the first collision information is generated when the 3D model of the target virtual character collides with a side surface or an upper surface of the collision box.

In step 1022, that the target virtual character is located in the target region can be determined according to the first collision information.

The terminal determines, according to the first collision information, that the target virtual character is located in the target region.

For example, the terminal determines, according to the information indicating that the 3D model of the target virtual character enters the collision box of the first collision information, that the target virtual character is located in the target region.

For example, the terminal determines, according to the first collision information and location information of the target virtual character, that the target virtual character is located in the target region. After receiving the first collision information, the terminal obtains coordinates of the target virtual character, and determines, when the coordinates of the target virtual character are located in the target region, that the target virtual character is located in the target region.

In step 1031, in response to the virtual character (e.g., the target virtual character) being located in the target region and the target virtual character having not been moved during a reference time interval, the target virtual character can be controlled to sink in the target region. In an example, in response to the virtual character being located in the target region and an amount of time that the virtual character has not been moved reaching a time threshold, the virtual character is controlled to sink in the target region.

The terminal controls, in response to that the target virtual character is located in the target region and the target virtual character has not moved in the reference time interval, the target virtual character to sink in the target region.

For example, when entering the target region, the target virtual character does not immediately begin to sink. Moreover, if the target virtual character continuously moves in the target region, the target virtual character does not sink either. In some examples, only when the target virtual character enters the target region and has stayed at a place for an excessively long time, the target virtual character begins to sink. That is, after entering the target region, the target virtual character needs to continuously move, to avoid sinking.

For example, the reference time interval is arbitrary. For example, the reference time interval is 3 seconds. That is to say, if the target virtual character has not moved in 3 seconds in the target region, the target virtual character is controlled to sink.

For example, as shown in FIG. 8, step 1031 can be implemented as step 1031-1.

In step 1031-1, in response to the target virtual character being located in the target region and the target virtual character having not been moved in a reference time interval, the 3D model of the target virtual character can be controlled to gradually descend in a vertical direction in the target region.

The terminal controls, in response to that the target virtual character is located in the target region and the target virtual character has not moved in the reference time interval, the 3D model of the target virtual character to gradually descend in the vertical direction in the target region.

For example, the sinking means that the 3D model of the target virtual character gradually descend in the vertical direction. That is, the target virtual character does not move in a horizontal direction, but moves in the vertical direction. In an example, the target virtual character only moves in the vertical direction. For example, after the target virtual character has stopped in the target region for an excessively long time, the target virtual character is fixed at the original place, cannot move, and gradually descends. That is, when the target virtual character is sinking, the user cannot control the target virtual character to move.

The virtual character (e.g., the target virtual character) can be eliminated from the virtual environment based on an elimination condition being satisfied. For example, when the target virtual character meets an elimination condition, the target virtual character is eliminated from the virtual environment. For example, the elimination condition includes at least one of a first elimination condition, a second elimination condition, and/or the like.

The virtual character (or the target virtual character) can be eliminated from the virtual environment when a height (or a distance) by which the virtual character sinks reaches a distance threshold. For example, the elimination condition includes a first elimination condition, where the first elimination condition is that the height (or the distance) by which the target virtual character sinks reaches the distance threshold.

For example, when the target virtual character sinks to a specific depth, that is, when the height by which the target virtual character sinks reaches the distance threshold, the target virtual character is eliminated, and has a game failure. For example, when the head of the target virtual character sinks to a place below the horizontal plane in which the target region is located, the target virtual character is eliminated.

For example, the distance threshold is arbitrary. The distance threshold can be determined according to the height of the 3D model of the target virtual character, or can be determined according to the depth of the target region; or the distance threshold is a randomly generated value. For example, the distance threshold is equal to a distance between feet and eyes of the target virtual character, for example, 5 unit lengths. When the target virtual character sinks by 5 unit lengths, it is determined that the target virtual character is eliminated.

For example, the height by which the target virtual character sinks is determined according to coordinates of the target virtual character in the virtual environment. For example, if the vertical direction perpendicular to the horizontal plane is used as a z-axis, when the target virtual character is located in the target region and has a z coordinate along the z-axis (or a z-axis coordinate) descending by 5 unit lengths, it is determined that the target virtual character is eliminated. Alternatively, using an example in which the horizontal plane is at a zero point on the z-axis, when the z-axis coordinate of the target virtual character is −5, it is determined that the target virtual character is eliminated.

The virtual character (or the target virtual character) can be eliminated from the virtual environment when a state value of the virtual character reaches a health point threshold. For example, the elimination condition includes a second elimination condition. The second elimination condition can be that the state value of the virtual character reaches a state threshold (e.g., the health point threshold). In an example, the second elimination condition is that the state value of the target virtual character is less than the health point threshold. For example, when the state value of the target virtual character meets a condition, that is, when the state value of the target virtual character is less than the health point threshold, the target virtual character is eliminated. For example, when the state value of the target virtual character is zero, the target virtual character is eliminated. The health point threshold is an arbitrarily set value. For example, the health point threshold is zero. Alternatively, the health point threshold is determined according to a maximum value of the state value. For example, the health point threshold is equal to one percent of the maximum value of the state value.

For example, it can be further determined, according to a collision between the target virtual character and the lower surface of the collision box, that the target virtual character is eliminated. For example, when the target virtual character collides with the lower surface of the collision box and third collision information is generated, it is determined that the target virtual character is eliminated. The third collision information includes information indicating that the 3D model of the target virtual character exits the collision box from the lower surface of the collision box.

In step 104, in response to the target virtual character being located in the target region, a state value of the target virtual character can be controlled to decrease at a first rate.

The terminal controls, in response to that the target virtual character is located in the target region, the state value of the target virtual character to decrease at the first rate.

For example, when the target virtual character is located in the target region, the state value of the target virtual character gradually decreases. The state value includes at least one of a health point value, a signal value, a mana point value, equipment durability, a health point value recovery rate, or a fury value of the target virtual character.

For example, the first rate is arbitrary. For example, the first rate is 1 unit/s (second). For example, the first rate is determined according to the target virtual character. For example, the state value is a health point value, and when the target virtual character is dressed in an armor suit, the first rate is decreasing by 5 health points per second; and when the target virtual character is dressed in a leisure suit, the first rate is decreasing by 10 health points per second. For example, the first rate is determined according to a target region. For example, for a same target virtual character, when the target virtual character is located in a first target region, the first rate is decreasing by 10 health points per second; and when the target virtual character is located in a second target region, the first rate is decreasing by 5 health points per second. For example, the first rate can be further determined according to the height by which the target virtual character sinks. For example, when the target virtual character sinks by 1 unit distance, the first rate is decreasing by 5 health points per unit distance; and when the target virtual character sinks by 2 unit distances, the first rate is decreasing by 10 health points per unit distance.

For example, in response to that the target virtual character is located in the target region, the state value of the target virtual character can alternatively be controlled to increase at the first rate. The state value is at least one of a hunger value, a coldness value, or a fatigue value. When the state value is higher than a health point threshold, the target virtual character can also be controlled to be eliminated.

For example, in response to that the target virtual character is located in the target region and the target virtual character has not moved in the reference time interval, the state value of the target virtual character is controlled to decrease at the first rate. Alternatively, in response to that the target virtual character sinks in the target region, the state value of the target virtual character is controlled to decrease at the first rate.

For example, the sinking and the decreasing of the state value are synchronous, and when the target virtual character begins to sink, the state value begins to decrease.

In step 105, in response to the target virtual character being located in the target region, a movement speed of the target virtual character can be controlled to change from a first movement speed of the virtual character, for example, in the neighboring region to a second movement speed of the virtual character in the target region, where the second movement speed is lower than the first movement speed.

The terminal controls, in response to that the target virtual character is located in the target region, the movement speed of the target virtual character to change from the first movement speed to the second movement speed.

For example, the target region further changes the movement speed of the target virtual character. When the target virtual character enters the target region, the movement speed is reduced. For example, the first movement speed is a movement speed at which the target virtual character moves on an ordinary ground. The second movement speed is a movement speed at which the target virtual character moves in the target region. For example, the second movement speed is determined according to the first movement speed. For example, after the target virtual character enters the target region, the second movement speed is equal to the first movement speed minus a speed difference. Alternatively, the first movement speed is determined according to a basic movement speed and an equipment upgrading speed. When the target virtual character enters the target region, the second movement speed is the basic movement speed, but does not have the equipment upgrading speed, that is, the equipment upgrading speed is invalid in the target region.

For example, the decreasing of the movement speed and the sinking are asynchronous, and when the target virtual character enters the target region, the movement speed decreases, and the condition that the target virtual character has not moved in the reference time interval does not need to be met.

Figure 9:
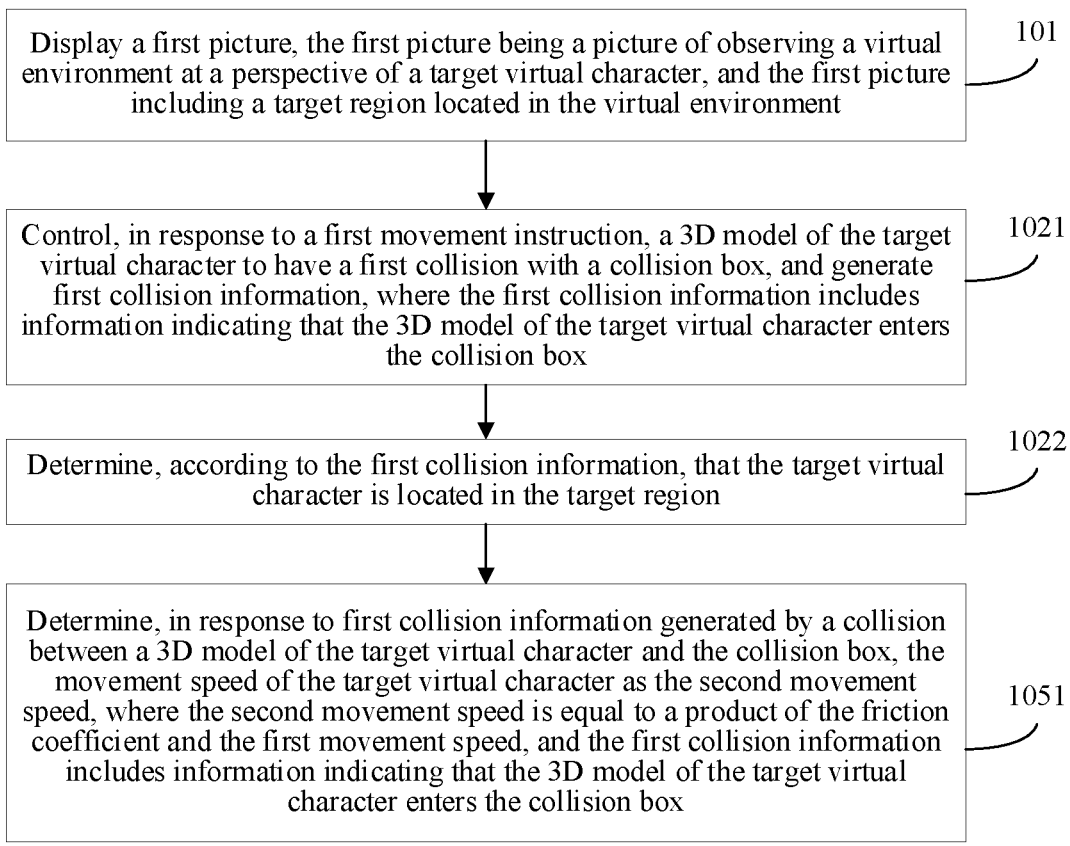
FIG. 9 is a method flowchart of a method for controlling a virtual character in a virtual environment according to another exemplary embodiment of this disclosure.

For example, as shown in FIG. 9, step 105 includes step 1051.

In step 1051, in response to first collision information generated by a collision between a 3D model of the target virtual character and the collision box, the movement speed of the target virtual character can be determined as the second movement speed, where the second movement speed is equal to a product of the friction coefficient and the first movement speed, and the first collision information includes information indicating that the 3D model of the target virtual character enters the collision box. The friction coefficient is associated with the target region.

The terminal determines, in response to the first collision information generated by the collision between the 3D model of the target virtual character and the collision box, the movement speed of the target virtual character as the second movement speed.

For example, when the 3D model of the target virtual character collides with the collision box in the target region, the movement speed of the target virtual character is changed to the second movement speed. For example, after the location of the target virtual character is comprehensively determined according to the collision information and coordinates of the target virtual character, whether to change the movement speed of the target virtual character is determined.

For example, each target region corresponds to one friction coefficient. For example, target regions, collision boxes, and friction coefficients are in a one-to-one correspondence. The terminal determines, according to a collision box, a target region entered by the target virtual character, and obtains a friction coefficient corresponding to the target region. For example, the terminal determines the second movement speed according to the friction coefficient and the first movement speed. For example, the second movement speed is equal to the first movement speed multiplied by the friction coefficient. For example, the friction coefficient is a value greater than 0 and less than or equal to 1. For example, when the target virtual character collides with the collision box and the first collision information is generated, the terminal obtains the friction coefficient 0.5 corresponding to the collision box, and performs calculation according to the friction coefficient 0.5 and the first movement speed 1 m/s (meter per second) of the target virtual character to learn that the second movement speed of the target virtual character is 0.5 m/s.

For example, the virtual environment includes at least two target regions, and the at least two target regions correspond to at least two different friction coefficients.

For example, the virtual environment includes different target regions. Each target region corresponds to a different friction coefficient. That is, when a same target virtual character enters different target regions, the target virtual character is also at different second movement speeds. After obtaining information about a collision between the 3D model of the target virtual character and the collision box, the terminal determines the friction coefficient corresponding to the target region according to the collision box, and performs calculation according to the friction coefficient and the first movement speed to obtain the second movement speed. The movement speed of the target virtual character is changed to the second movement speed.

Figure 10:
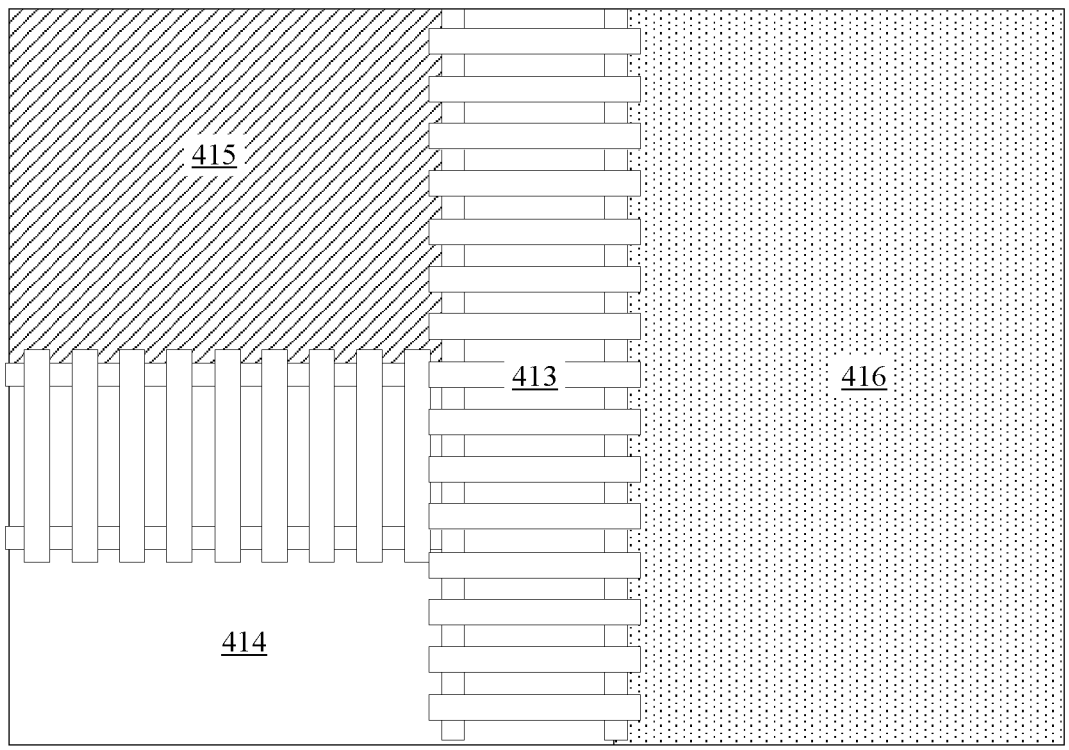
FIG. 10 is a schematic diagram of a virtual environment during implementation of a method for controlling a virtual character in a virtual environment according to another exemplary embodiment of this disclosure.

For example, as shown in FIG. 10, a virtual environment includes a bridge 413, an ordinary ground 414, a fourth target region 415, and a fifth target region 416. If a movement speed of the target virtual character on the bridge 413 and the ordinary ground 414 is a first movement speed (e.g., 3 m/s), a friction coefficient of the fourth target region 415 is 0.8, and a friction coefficient of the fifth target region is 0.2, the target virtual character moves in the fourth target region 415 at a second movement speed of 2.4 m/s, and moves in the fifth target region 416 at a second movement speed of 0.6 m/s. In an example, the friction coefficient of the bridge 413 and the ordinary ground 414 is 1. A friction coefficient (e.g., 0.8) associated with a target region (e.g., the target region 415) is different from a friction coefficient (e.g., 1) associated with a neighboring region (e.g., the bridge 413) of the target region (e.g., the target region 415).

In step 106, in response to the target virtual character meeting an elimination condition, that the target virtual character is eliminated can be determined.

The terminal determines, in response to that the target virtual character meets the elimination condition, that the target virtual character is eliminated.

For example, the elimination condition includes at least one of a first elimination condition or a second elimination condition. The first elimination condition is that a height by which the target virtual character sinks reaches a distance threshold; and the second elimination condition is that a state value of the target virtual character is less than a health point threshold. For example, when the target virtual character sinks by an excessive height or the state value of the target virtual character is excessively low, the target virtual character is eliminated. For example, if the second elimination condition is that the health point value of the target virtual character is less than 0.1, and the first elimination condition is that the target virtual character sinks by 10 unit distances, when the target virtual character descends by 3 unit distances and the health point value is 0, the target virtual character is eliminated; and when the target virtual character descends by 10 unit distances and the health point value is 100, the target virtual character is also eliminated.

For example, when the target virtual character descends by an excessive height and the state value of the target virtual character is excessively low, the target virtual character is eliminated. For example, if the second elimination condition is that the health point value of the target virtual character is less than 0.1, and the first elimination condition is that the target virtual character sinks by 10 unit distances, when the target virtual character descends by 10 unit distances and the health point value is 0, the target virtual character is eliminated.

In step 108, the 3D model of the target virtual character can be controlled to have a second collision with the collision box, and then to generate second collision information, where the second collision information includes information indicating that the 3D model of the target virtual character exits the collision box.

The terminal controls the 3D model of the target virtual character to have the second collision with the collision box, and generates the second collision information.

For example, when the target virtual character leaves the target region, the 3D model of the target virtual character has the second collision with the collision box, and the second collision information is generated, where a content type in the second collision information is similar to that in the first collision information. The second collision information includes information indicating that the 3D model of the target virtual character exits the collision box. The terminal can determine, according to the second collision information, that the target virtual character leaves the target region.

In step 109, according to the second collision information, that the target virtual character leaves the target region can be determined.

The terminal determines, according to the second collision information, that the target virtual character leaves the target region.

For example, in response to that the target virtual character leaves the target region, the target virtual character is controlled to stop sinking; or the target virtual character is controlled to stop sinking and a z-axis coordinate of the target virtual character is controlled to recover to a coordinate value before the sinking.

For example, in response to that the target virtual character leaves the target region, the movement speed of the target virtual character is controlled to be changed from the second movement speed to the first movement speed or the third movement speed. The third movement speed may be higher than the second movement speed or may be lower than the second movement speed. For example, the movement speed of the target virtual character is determined according to the hunger value of the target virtual character. When the target virtual character leaves the target region, the target region does not affect the movement speed of the target virtual character anymore, but a change in the hunger value of the target virtual character may cause the movement speed of the target virtual character to be lower than the second movement speed or higher than the first movement speed.

For example, in response to that the target virtual character leaves the target region, the state value of the target virtual character is controlled to stop decreasing.

For example, in response to that the target virtual character leaves the target region, the state value of the target virtual character is controlled to increase at the second rate. For example, when the target virtual character leaves the target region, a stamina value of the target virtual character is controlled to slowly recover.

In conclusion, according to the method provided in this disclosure, when the target virtual character enters the target region, the movement speed of the target virtual character is reduced, so that the target virtual character moves slowly in the target region, to cause an effect of the target region on the target virtual character to be closer to effects of swamp and quicksand. The user can experience effects of characteristics of different terrains on a movement manner, so that simulation reality of a terrain in a virtual environment is relatively high, thereby facilitating an increase in an interaction rate.

According to the method provided in this disclosure, after the target virtual character enters the target region, the movement speed of the target virtual character is reduced, so that it is easier for another virtual character near the target region to attack the target virtual character, to make it convenient to eliminate the target virtual character. The elimination speed of the virtual character is increased, to cause a battle to end as soon as possible, thereby improving the man-machine interaction efficiency, alleviating the calculation amount of the server, and reducing the load of the server.

According to the method provided in this disclosure, when the target virtual character enters the target region, the state value of the target virtual character is reduced, so that the state value of the target virtual character such as the stamina value, the hunger value, or the health point value is also affected by the target region, and the effect of the target region on the target virtual character is closer to effects of swamp and quicksand. The user can experience effects of characteristics of different terrains on a state value, to help further improve simulation reality of a terrain in the virtual environment and improving an interaction rate.

According to the method provided in this disclosure, by setting the target region, when the target virtual character is located in the target region, the target virtual character sinks, and the target virtual character is eliminated after the target virtual character sinks by a specific height. The method adds an elimination manner of the virtual character, so that the elimination manner of the virtual character is not limited to that the state value of the virtual character is 0. Even if the virtual character is not attacked by another virtual character, the virtual character is still eliminated in a sinking manner, and the elimination speed of the virtual character is increased, to cause a battle to end as soon as possible, thereby improving the man-machine interaction efficiency, alleviating the calculation amount of the server, and reducing the load of the server.

According to the method provided in this disclosure, after the target virtual character enters the target region and has stopped moving in the target region for a period of time, the target virtual character is controlled to begin to sink, so that an on-hook (the user leaves/does not control the virtual character anymore) virtual character can be eliminated by the target region, to increase the battle speed, thereby improving the man-machine interaction efficiency, alleviating the calculation amount of the server, and reducing the load of the server.

According to the method provided in this disclosure, by controlling the state value of the target virtual character to decrease while the target virtual character is sinking, when the target virtual character meets any one of elimination conditions that the state value is less than the health point threshold and that the target virtual character sinks by a specific height, the target virtual character is eliminated, and the elimination speed of the virtual character is increased, to cause a battle to end as soon as possible, thereby improving the man-machine interaction efficiency, alleviating the calculation amount of the server, and reducing the load of the server.

According to the method provided in this disclosure, by setting the collision box in the target region, after the target virtual character collides with the collision box, the collision box generates collision information, where the collision information includes information indicating that the target virtual character enters/exits the collision box, to make it convenient for the terminal to confirm the location of the target virtual character, thereby correspondingly changing the movement speed or another game state of the target virtual character, which facilitates an improvement in the perception capability of the terminal for the location of the target virtual character, a decrease in the probability that the terminal misjudges the location of the target virtual character, and an increase in the interaction rate.

For example, an exemplary embodiment in which the target region generates different action effects on a virtual character controlled by a terminal and a virtual character controlled by AI is provided.

Figure 11:
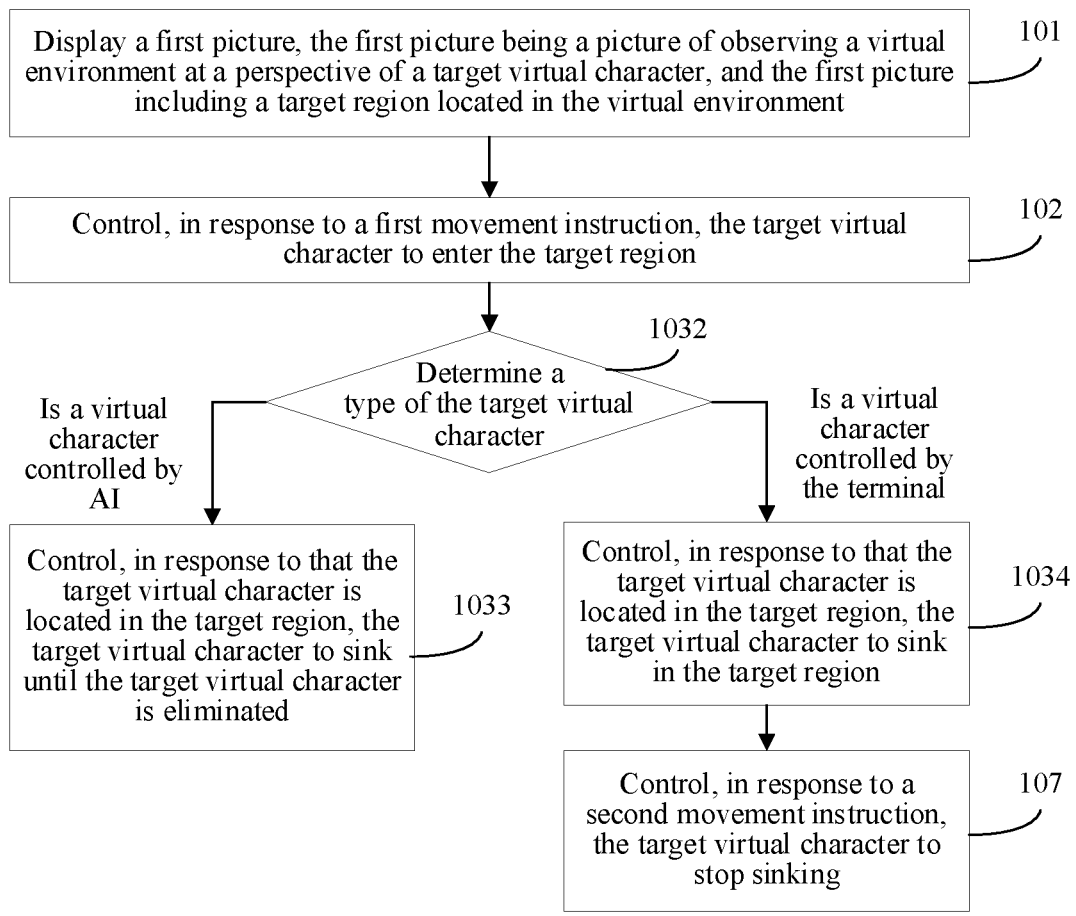
FIG. 11 is a method flowchart of a method for controlling a virtual character in a virtual environment according to another exemplary embodiment of this disclosure.

FIG. 11 is a method flowchart of a method for controlling a virtual character in a virtual environment according to an exemplary embodiment of this disclosure. A description is made by using an example in which the method is performed by the terminal shown in FIG. 1, an application supporting a virtual environment is run on the terminal, and based on the exemplary embodiment provided in FIG. 3, step 103 includes step 1032 to step 1034, and further includes step 107 after step 1034.

In step 1032, a type of the target virtual character can be determined.

The terminal determines the type of the target virtual character. If the target virtual character is a virtual character controlled by a terminal, step 1034 is performed. If the target virtual character is a virtual character controlled by AI, step 1033 is performed.

In step 1033, in response to the target virtual character being located in the target region, the target virtual character can be controlled to sink until the target virtual character is eliminated.

The terminal controls, in response to that the target virtual character is located in the target region, the target virtual character to sink until the target virtual character is eliminated.

For example, when the target virtual character is the virtual character in an application and is controlled by the AI, after the target virtual character begins to sink, the target virtual character cannot stop sinking, until the target virtual character is eliminated from the virtual environment.

For example, the virtual character controlled by the AI includes a wild monster, a hopping vampire, or a zombie. For example, the virtual character controlled by the AI chases and attacks the virtual character controlled by the terminal. For example, the virtual character controlled by the terminal needs to kill the virtual character controlled by the AI. For example, the virtual character controlled by the terminal has a skill or prop of fixing the virtual character controlled by the AI at the original place. After inducing the virtual character controlled by the AI to the target region, the virtual character controlled by the terminal uses the skill or prop, so that after the time for which the virtual character controlled by the AI has stopped moving in the target region meets a threshold, the virtual character controlled by the AI begins to sink in the target region, and cannot move. When the virtual character controlled by the AI has a state value less than the health point threshold or sinks by a height reaching the distance threshold, the virtual character controlled by the AI is eliminated. In this way, the virtual character controlled by the terminal can make use of a target terrain to kill the virtual character controlled by the AI.

In step 1034, in response to the target virtual character being located in the target region, the target virtual character can be controlled to sink in the target region.

For example, when the target virtual character is the virtual character controlled by the terminal, that is, the virtual character controlled by the user, after the target virtual character begins to sink, the target virtual character can control, through a specific operation, the target virtual character to stop sinking.

In step 107, in response to a second movement instruction, the target virtual character can be controlled to stop sinking.

The terminal controls, in response to the second movement instruction, the target virtual character to stop sinking.

For example, the second movement instruction is generated after the user performs a movement operation. The second movement instruction is used for controlling the target virtual character to move. For example, after the target virtual character has stopped moving for a period of time in the target region, the target virtual character begins to sink, and after the target virtual character begins to sink, the user can control, through a movement operation, the target virtual character to stop sinking and begin to move again.

For example, the second movement instruction is generated by the user through a jumping operation. After receiving the second movement instruction, the terminal controls the target virtual character to jump and stop sinking. For example, before beginning to sink, the target virtual character has a z-axis coordinate of 0. When the target virtual character sinks to a z-axis coordinate of −1, the user performs the jumping operation, so that the terminal not only controls the target virtual character to stop sinking, but also changes the coordinate of the target virtual character in the vertical direction to the coordinate before the sinking, that is, changes −1 to 0, to cause the target virtual character to return to the ground surface again.

For example, after the target virtual character begins to sink, some movement operations of the user are prohibited, for example, at least one of a movement operation of the user capable of controlling the target virtual character to lie prone, a movement operation of the user capable of controlling the target virtual character to squat, or a movement operation of the user capable of controlling the target virtual character to move forward, backward, leftward, or rightward. For example, only after the user controls, through the jumping operation, the target virtual character to stop sinking, the user can perform another movement operation.

For example, the terminal can alternatively control, in response to another instruction, the target virtual character to stop sinking, for example, control, in response to a prop use instruction, the target virtual character to stop sinking. For example, after the target virtual character begins to sink, the user controls the target virtual character to use a freezing prop, to freeze the target region, and controls the target virtual character to stop sinking.

In conclusion, according to the method provided in this disclosure, when the target virtual character is the virtual character controlled by the terminal, the terminal can control, by generating a sinking cancellation instruction, the target virtual character to cancel sinking. When the target virtual character is the virtual character controlled by the AI, the target virtual character constantly sinks until being eliminated. In an example, when the target virtual character is the virtual character controlled by the AI, the target virtual character can only constantly sink until being eliminated. Therefore, the user can induce, through this characteristic, the virtual character controlled by the AI to the target region, so that the virtual character controlled by the AI sinks and is eliminated, and the elimination speed of the virtual character is increased, to cause a battle to end as soon as possible, thereby improving the man-machine interaction efficiency, alleviating the calculation amount of the server, and reducing the load of the server.

For example, an exemplary embodiment in which a virtual character in a virtual environment provided in this disclosure is applied to a hopping vampire mode is provided.

Figure 12:
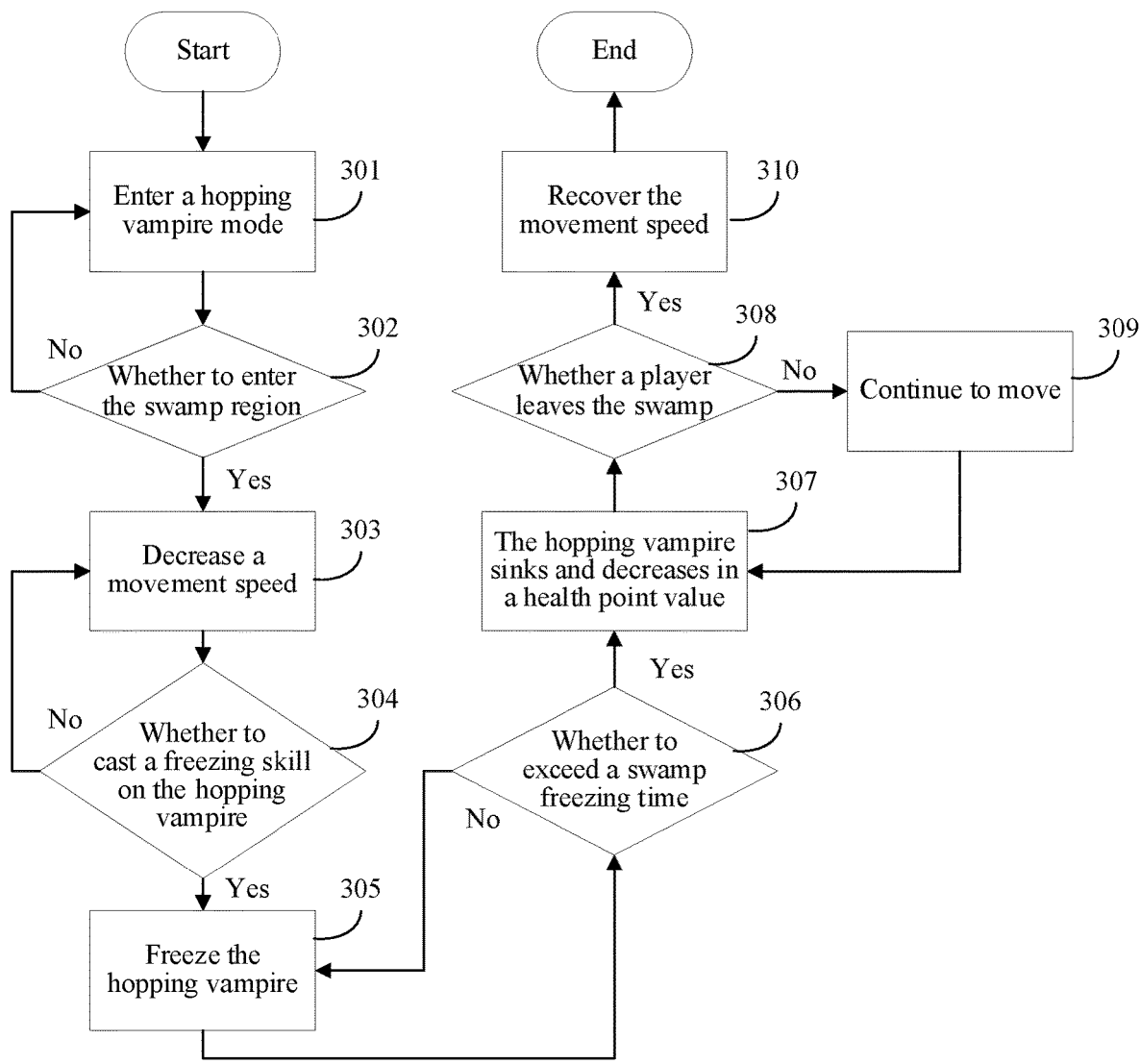
FIG. 12 is a method flowchart of a method for controlling a virtual character in a virtual environment according to another exemplary embodiment of this disclosure.

FIG. 12 is a method flowchart of a method for controlling a virtual character in a virtual environment according to an exemplary embodiment of this disclosure. A description is made by using an example in which the method is performed by the terminal shown in FIG. 1, an application supporting a virtual environment is run on the terminal, and the method includes:

In step 301, a hopping vampire mode can be entered.

Figure 13:
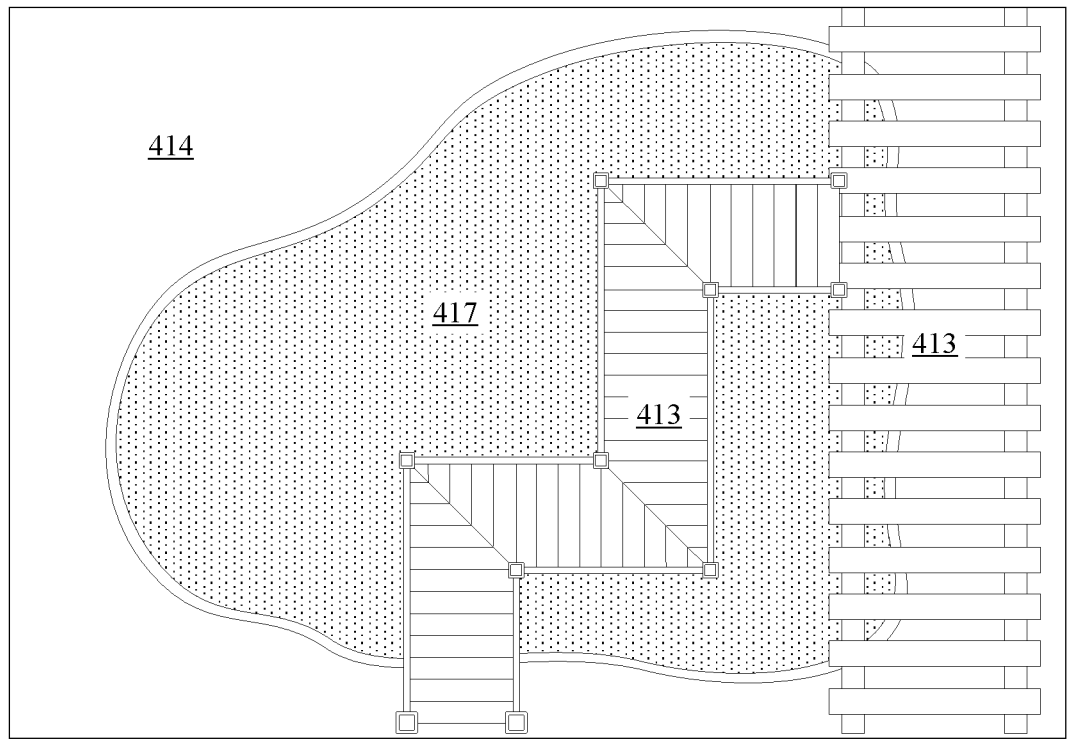
FIG. 13 is a schematic diagram of a virtual environment during implementation of a method for controlling a virtual character in a virtual environment according to another exemplary embodiment of this disclosure.

The terminal controls a main control virtual character to enter the hopping vampire mode. For example, a virtual environment of the hopping vampire mode is shown in FIG. 13, and the virtual environment includes an ordinary ground 414, a bridge 413, and a swamp region 417 (target region).

In step 302, whether to enter the swamp region can be determined.

The terminal determines whether the main control virtual character (e.g., a first virtual character) enters the swamp. If the main control virtual character enters the swamp, step 303 is performed; otherwise, step 301 is performed. In an example, the main control virtual character is controlled by a player or a user.

For example, the terminal determines whether the main control virtual character or/and a hopping vampire (e.g., a second virtual character) enter the swamp.

In step 303, a movement speed of the main control virtual character can be decreased.

The terminal controls a movement speed of the main control virtual character and/or the hopping vampire to decrease. For example, the terminal controls the movement speed of the main control virtual character to change from a first movement speed to a second movement speed.

In step 304, whether to cast a freezing skill on the hopping vampire can be determined.

The terminal determines whether the main control virtual character casts the freezing skill on the hopping vampire. If the main control virtual character casts the freezing skill on the hopping vampire, step 305 is performed; otherwise, step 303 is performed.

In step 305, the hopping vampire is frozen. In an embodiment, the hopping vampire cannot move (e.g., be still) when the hopping vampire is frozen. In an example, when the main control virtual character uses the freezing skill on the hopping vampire, the main control virtual character causes the hopping vampire to freeze (e.g., to be still), and the hopping vampire is still.

The terminal controls the hopping vampire to be frozen.

In step 306, whether a swamp freezing time is exceeded can be determined.

The terminal determines whether a time (or a duration) of freezing the hopping vampire exceeds the swamp freezing time (or a threshold). The time of freezing the hopping vampire can also be referred to as a time of being still. If the time of freezing the hopping vampire (or the time of being still) exceeds the swamp freezing time (or the threshold), step 307 is performed; otherwise, step 305 is performed.

In step 307, the hopping vampire sinks and decreases in a health point value.

The terminal controls the hopping vampire to begins to sink, and controls the health point value of the hopping vampire to decrease at a first rate.

In step 308, whether a player leaves the swamp can be determined.

The terminal determines whether the main control virtual character leaves the swamp region. If the main control virtual character leaves the swamp region, step 310 is performed; otherwise, step 309 is performed.

In step 309, the main control virtual character is controlled to continue moving.

The terminal controls the main control virtual character to continue to move in the swamp region at the second movement speed.

In step 310, the movement speed (e.g., the first movement speed) is recovered.

The terminal controls the main control virtual character to recover the movement speed, that is, recover from the second movement speed to the first movement speed.

In conclusion, according to the method provided in this disclosure, the method for controlling a virtual character in a virtual environment provided in this disclosure is applied to the hopping vampire mode of the FPS game, where the main control virtual character controlled by the terminal (user) can induce the hopping vampire controlled by the AI to the target region (swamp region), and cast the freezing skill on the hopping vampire, so that the hopping vampire is affected by the target region to sink and is eliminated. The elimination speed of the virtual character is increased, to cause a battle to end as soon as possible, thereby improving the man-machine interaction efficiency, alleviating the calculation amount of the server, and reducing the load of the server.

The following describes apparatus embodiments of this disclosure. For details not described in detail in the apparatus embodiments, reference may be made to the foregoing method embodiments.

Figure 14:
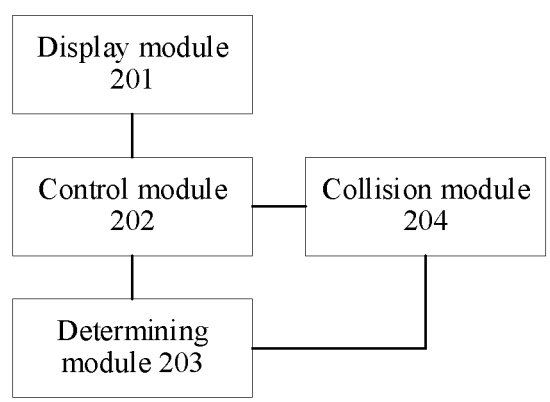
FIG. 14 is a block diagram of an apparatus for controlling a virtual character in a virtual environment according to another exemplary embodiment of this disclosure.

FIG. 14 is a block diagram of an apparatus for controlling a virtual character in a virtual environment according to an exemplary embodiment of this disclosure. The apparatus is applicable to a terminal, an application supporting the virtual environment is run on the terminal, and the apparatus includes a display module 201 and a control module 202. One or more of modules and/or units of the apparatus can be implemented by processing circuitry, software, or a combination thereof, for example.

The display module 201 is configured to display a first picture. The first picture is a picture of observing a virtual environment at a perspective of a target virtual character, and the first picture includes a target region located in the virtual environment.

The control module 202 is configured to control, in response to a first movement instruction, the target virtual character to enter the target region.

The control module 202 can be further configured to control, in response to that the target virtual character is located in the target region, the target virtual character to sink in the target region.

In an embodiment, the control module 202 is further configured to control, in response to that the target virtual character is located in the target region and the target virtual character has not moved in a reference time interval, the target virtual character to sink in the target region.

In an embodiment, the control module 202 is further configured to control a 3D model of the target virtual character to gradually descend in a vertical direction in the target region.

In an embodiment, the apparatus further includes a determining module 203 that is configured to determine, in response to the target virtual character meeting an elimination condition, that the target virtual character is eliminated.

The elimination condition can include at least one of a first elimination condition or a second elimination condition. The first elimination condition can be that a height (or a distance) by which the target virtual character sinks reaches a distance threshold. The second elimination condition can be that a state value of the target virtual character is less than a health point threshold.

In an embodiment, the control module 202 is further configured to control, in response to that the target virtual character is located in the target region, a state value of the target virtual character to decrease at a first rate.

In an embodiment, the control module 202 is further configured to control, in response to that the target virtual character is located in the target region, a movement speed of the target virtual character to change from a first movement speed to a second movement speed, where the second movement speed is lower than the first movement speed.

In an embodiment, the target region is provided with a collision box, and a distance between a bottom surface of the collision box and a horizontal plane in which the target region is located is less than a reference threshold.

The control module 202 is further configured to control the 3D model of the target virtual character to have a first collision with the collision box;

The apparatus can further include a collision module 204 that is configured to generate first collision information. The first collision information includes information indicating that the 3D model of the target virtual character enters the collision box.

The determining module 203 is further configured to determine, according to the first collision information, that the target virtual character is located in the target region.

In an embodiment, the control module 202 is further configured to control the 3D model of the target virtual character to have a second collision with the collision box. The collision module 204 is further configured to generate second collision information, where the second collision information includes information indicating that the 3D model of the target virtual character exits the collision box. The determining module 203 is further configured to determine, according to the second collision information, that the target virtual character leaves the target region.

In an embodiment, the target region is provided with a collision box, and the target region corresponds to a friction coefficient. The control module 202 is further configured to determine, in response to first collision information generated by a collision between a 3D model of the target virtual character and the collision box, the movement speed of the target virtual character as the second movement speed, where the second movement speed is equal to a product of the friction coefficient and the first movement speed, and the first collision information includes information indicating that the 3D model of the target virtual character enters the collision box.

In an embodiment, the virtual environment includes at least two target regions, and the at least two target regions correspond to at least two different friction coefficients.

In an embodiment, the target virtual character is a virtual character controlled by a terminal. The control module 202 is further configured to control, in response to a second movement instruction, the target virtual character to stop sinking.

In an embodiment, the target virtual character is a virtual character controlled by AI. The control module 202 is further configured to control the target virtual character to sink in the target region until the target virtual character is eliminated.

In an embodiment, by controlling, after a target virtual character moves to a target region, the target virtual character to sink in the target region, to simulate a feature that a natural terrain such as swamp or quicksand sinks, a user not only can see a difference between the swamp or quicksand terrain and an ordinary ground in a first picture, but also can experience, in a process of controlling an activity of the virtual character, effects of characteristics of different terrains on a movement manner from an effect of the swamp or quicksand terrain on the virtual character in the movement manner, so that simulation reality of a terrain in a virtual environment is relatively high, thereby facilitating an increase in an interaction rate.

The apparatus for controlling a virtual character in a virtual environment provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the apparatus for controlling a virtual character in a virtual environment and the method for controlling a virtual character in a virtual environment provided in the foregoing embodiments belong to the same concept. For a specific implementation process, refer to the method embodiment, and details are not described herein again.

Figure 15:
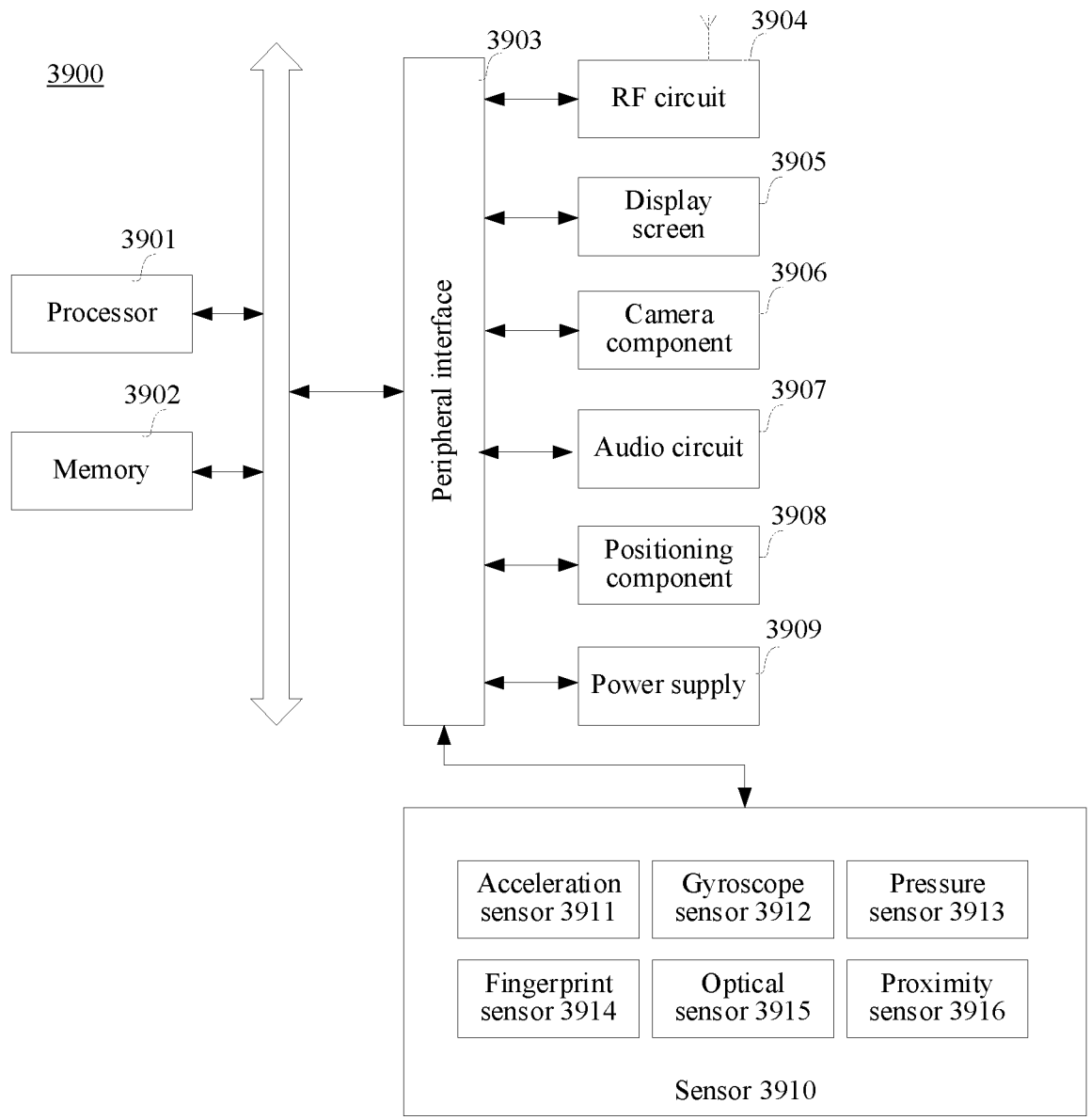
FIG. 15 is a block diagram of a terminal according to an exemplary embodiment of this disclosure.

FIG. 15 is a structural block diagram of a terminal 3900 according to an exemplary embodiment of this disclosure.

For example, the terminal 3900 is a smartphone, a tablet computer, an MP3 player, an MP4 player, a notebook computer, or a desktop computer. The terminal 3900 may also be referred to as user equipment, a portable terminal, a laptop terminal, or a desktop terminal, among other names.

Generally, the terminal 3900 includes processing circuitry, such as a processor 3901, and a memory 3902.

The processor 3901 includes one or more processing cores, for example, a 4-core processor or an 8-core processor. The processor 3901 may be implemented by at least one hardware form of a digital signal processor (DSP), a field-programmable gate array (FPGA), and a programmable logic array (PLA). The processor 3901 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 3901 may be integrated with a graphics processing unit (GPU). The GPU is configured to render and draw content that needs to be displayed on a display screen. In some embodiments, the processor 3901 may further include an AI processor. The AI processor is configured to process a calculation operation related to machine learning.

The memory 3902 includes one or more computer-readable storage media. The computer-readable storage medium is non-transient. The memory 3902 further includes a high-speed random access memory (RAM) and a non-volatile memory, such as one or more magnetic disk storage devices or flash storage devices. In some embodiments, a non-transitory computer-readable storage medium in the memory 3902 is configured to store at least one instruction, the at least one instruction being configured to be executed by the processor 3901 to implement the method for controlling a virtual character in a virtual environment provided in the method embodiments of this disclosure.

In some embodiments, the terminal 3900 may include a peripheral interface 3903 and at least one peripheral. The processor 3901, the memory 3902, and the peripheral interface 3903 may be connected by a bus or a signal cable. Each peripheral may be connected to the peripheral interface 3903 by a bus, a signal cable, or a circuit board. For example, the peripheral includes: at least one of a radio frequency (RF) circuit 3904, a display screen 3905, a camera component 3906, an audio circuit 3907, a positioning component 3908, and a power supply 3909.

The peripheral interface 3903 may be configured to connect the at least one peripheral related to Input/Output (I/O) to the processor 3901 and the memory 3902. In some embodiments, the processor 3901, the memory 3902, and the peripheral interface 3903 are integrated on the same chip or the same circuit board. In some other embodiments, any one or two of the processor 3901, the memory 3902, and the peripheral interface 3903 may be implemented on an independent chip or circuit board. This is not limited in this embodiment.

The RF circuit 3904 is configured to receive and transmit an RF signal, also referred to as an electromagnetic signal. The RF circuit 3904 communicates with a communication network and other communication devices through the electromagnetic signal. The RF circuit 3904 converts an electrical signal into an electromagnetic signal for transmission, or converts a received electromagnetic signal into an electrical signal. The RF circuit 3904 can include: an antenna system, an RF transceiver, one or more amplifiers, a tuner, an oscillator, a digital signal processor, a codec chip set, a subscriber identity module card, and the like. The RF circuit 3904 may communicate with another terminal through at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a Wi-Fi network. In some embodiments, the RF circuit 3904 may further include a circuit related to near field communication (NFC), which is not limited in this disclosure.

The display screen 3905 is configured to display a user interface (UI). The UI may include a graph, a text, an icon, a video, and any combination thereof. When the display screen 3905 is a touch display screen, the display screen 3905 is further capable of collecting touch signals on or above a surface of the display screen 3905. The touch signal may be inputted to the processor 3901 for processing as a control signal. In this case, the display screen 3905 may be further configured to provide a virtual button and/or a virtual keyboard that are/is also referred to as a soft button and/or a soft keyboard. In some embodiments, there is one display screen 3905, disposed on a front panel of the terminal 3900. In some other embodiments, there are at least two display screens 3905, disposed on different surfaces of the terminal 3900 respectively or in a folded design. In still other embodiments, the display screen 3905 is a flexible display screen, disposed on a curved surface or a folded surface of the terminal 3900. Even, the display screen 3905 may be further set to have a non-rectangular irregular pattern, that is, a special-shaped screen. The display screen 3905 may be prepared by using materials such as a liquid crystal display (LCD), an organic light-emitting diode (OLED), or the like.

The camera component 3906 is configured to capture images or videos. The camera component 3906 can include a front-facing camera and a rear-facing camera. Generally, the front-facing camera is disposed on the front panel of the terminal 3900, and the rear-facing camera is disposed on a back face of the terminal 3900. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 3906 may further include a flash. The flash is a single color temperature flash or a double color temperature flash. The double color temperature flash is a combination of a warm light flash and a cold light flash, and may be used for light compensation under different color temperatures.

The audio circuit 3907 includes a microphone and a speaker. The speaker is configured to collect sound waves of a user and an environment, and convert the sound waves into electric signals and input the electrical signals into the processor 3901 for processing, or input the electrical signals into the radio frequency circuit 3904 to implement speech communication. For the purpose of stereo acquisition or noise reduction, there are a plurality of microphones, disposed at different parts of the terminal 3900 respectively. The microphone is an array microphone or an omni-directional acquisition microphone. The speaker is configured to convert electrical signals from the processor 3901 or the RF circuit 3904 into sound waves. The speaker can be a thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 3907 may further include an earphone jack.

The positioning component 3908 is configured to determine a current geographic location of the terminal 3900, to implement a navigation or a location based service (LBS). For example, the positioning component 3908 may be a positioning component based on the Global Positioning System (GPS) of the United States, the China's Beidou Navigation Satellite System (BDS), or the Galileo system of Russia.

The power supply 3909 is configured to supply power to components in the terminal 3900. For example, the power supply 3909 is an alternating current, a direct current, a disposable battery, or a rechargeable battery. When the power supply 3909 includes a rechargeable battery, the rechargeable battery is a wired rechargeable battery or a wireless rechargeable battery. The wired rechargeable battery is a battery charged through a wired circuit, and the wireless rechargeable battery is a battery charged through a wireless coil. The rechargeable battery may further be configured to support a quick charge technology.

In some embodiments, the terminal 3900 further includes one or more sensors 3910. The one or more sensors 3910 include, but are not limited to: an acceleration sensor 3911, a gyroscope sensor 3912, a pressure sensor 3913, a fingerprint sensor 3914, an optical sensor 3915, and a proximity sensor 3916.

The acceleration sensor 3911 may detect the magnitude of acceleration on three coordinate axes of a coordinate system established by the terminal 3900. For example, the acceleration sensor 3911 may be configured to detect components of the gravity acceleration on the three coordinate axes. The processor 3901 may control, according to a gravity acceleration signal collected by the acceleration sensor 3911, the touch display screen 3905 to display the UI in a landscape view or a portrait view. The acceleration sensor 3911 may be further configured to acquire motion data of a game or a user.

The gyroscope sensor 3912 may detect a body direction and a rotation angle of the terminal 3900. The gyroscope sensor 3912 may acquire a 3D action of the user on the terminal 3900 together with the acceleration sensor 3911. The processor 3901 may implement the following functions according to data collected by the gyroscope sensor 3912: motion sensing (for example, the UI is changed according to a tilt operation of the user), image stabilization during shooting, game control, and inertial navigation.

The pressure sensor 3913 may be disposed at a side frame of the terminal 3900 and/or a lower layer of the display screen 3905. When the pressure sensor 3913 is disposed on the side frame of the terminal 3900, a holding signal of the user to the terminal 3900 may be detected, and left/right hand identification or a quick action may be performed by the processor 3901 according to the holding signal acquired by the pressure sensor 3913. When the pressure sensor 3913 is disposed on the low layer of the display screen 3905, the processor 3901 controls, according to a pressure operation of the user on the display screen 3905, an operable control on the UI. The operable control includes at least one of a button control, a scroll-bar control, an icon control, and a menu control.

The fingerprint sensor 3914 is configured to acquire a user's fingerprint, and the processor 3901 identifies a user's identity according to the fingerprint acquired by the fingerprint sensor 3914, or the fingerprint sensor 3914 identifies a user's identity according to the acquired fingerprint. When identifying that the user's identity is a trusted identity, the processor 3901 authorizes the user to perform related sensitive operations. The sensitive operations include: unlocking a screen, viewing encrypted information, downloading software, paying, changing a setting, and the like. The fingerprint sensor 3914 may be disposed on a front surface, a back surface, or a side surface of the terminal 3900. When a physical button or a vendor logo is disposed on the terminal 3900, the fingerprint sensor 3914 may be integrated with the physical button or the vendor logo.

The optical sensor 3915 is configured to acquire ambient light intensity. In an embodiment, the processor 3901 may control display brightness of the display screen 3905 according to the ambient light intensity acquired by the optical sensor 3915. For example, when the ambient light intensity is relatively high, the display brightness of the display screen 3905 is turned up. When the ambient light intensity is relatively low, the display brightness of the display screen 3905 is turned down. In another embodiment, the processor 3901 may further dynamically adjust a camera parameter of the camera component 3906 according to the ambient light intensity acquired by the optical sensor 3915.

The proximity sensor 3916, also referred to as a distance sensor, is generally disposed on the front panel of the terminal 3900. The proximity sensor 3916 is configured to acquire a distance between the user and the front surface of the terminal 3900. In an embodiment, when the proximity sensor 3916 detects that the distance between the user and the front surface of the terminal 3900 gradually becomes small, the display screen 3905 is controlled by the processor 3901 to switch from a screen-on state to a screen-off state. When the proximity sensor 3916 detects that the distance between the user and the front surface of the terminal 3900 gradually increases, the display screen 3905 is controlled by the processor 3901 to switch from the screen-off state to the screen-on state.

A person skilled in the art can understand that the structure shown in FIG. 15 does not constitute a limitation to the terminal 3900, and the terminal may include more or fewer components than those shown in the figure, or some components may be combined, or a different component arrangement may be used.

This disclosure further provides a computer device, including a processor and a memory, the memory storing at least one instruction, at least one program, a code set, or an instruction set, the at least one instruction, the at least one program, the code set, or the instruction set being loaded and executed by the processor to implement the method for controlling a virtual character in a virtual environment according to any one of the foregoing exemplary embodiments.

This disclosure further provides a computer storage medium, such as a non-transitory computer-readable storage medium, storing at least one instruction, at least one program, a code set, or an instruction set, the at least one instruction, the at least one program, the code set, or the instruction set being loaded and executed by a processor to implement the method for controlling a virtual character in a virtual environment according to any one of the foregoing exemplary embodiments.

In an exemplary embodiment, a computer program product is further provided, storing at least one instruction, at least one program, a code set, or an instruction set, the at least one instruction, the at least one program, the code set, or the instruction set being loaded and executed by a processor to implement the method for controlling a virtual character in a virtual environment according to any one of the foregoing exemplary embodiments.

A person of ordinary skill in the art may understand that all or some of the steps of the foregoing embodiments may be implemented by hardware, or may be implemented a program instructing related hardware. The program may be stored in a non-transitory computer-readable storage medium. The non-transitory computer-readable storage medium is: a ROM, a magnetic disk, or an optical disc.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. An information processing method, comprising:
   displaying a picture of a virtual environment, the picture including a target region located in the virtual environment, the target region being adjacent to a neighboring region in the virtual environment;
   in response to a first movement instruction, controlling, by processing circuitry of an information processing apparatus, a virtual character to enter the target region from the neighboring region; and
   controlling the virtual character to sink in the target region based on (i) whether the virtual character moves within the target region and (ii) whether the virtual character is player controlled, wherein
   a first movement speed of a movement type of the virtual character in the neighboring region is higher than a second movement speed of the movement type of the virtual character in the target region,
   when the virtual character is player controlled, the virtual character is controlled to stop sinking in response to a second movement instruction, and
   when the virtual character is not player controlled, the virtual character is controlled to sink until the virtual character is eliminated.

2. The method according to claim 1, further comprising:
   controlling, in response to the virtual character being located in the target region, the virtual character to sink in the target region.

3. The method according to claim 2, wherein the controlling the virtual character to sink in the target region comprises:
   in response to the virtual character being located in the target region and an amount of time that the virtual character has not been moved reaching a time threshold, controlling, the virtual character to sink in the target region.

4. The method according to claim 3, wherein the controlling the virtual character to sink in the target region comprises:
   controlling a three-dimensional (3D) model of the virtual character to descend in a vertical direction in the target region, the 3D model representing the virtual character.

5. The method according to claim 2, further comprising:
   eliminating the virtual character from the virtual environment based on a distance by which the virtual character sinks reaching a distance threshold.

6. The method according to claim 2, further comprising:
   eliminating the virtual character from the virtual environment based on a state value of the virtual character reaching a health point threshold.

7. The method according to claim 2, further comprising:
   controlling, in response to the virtual character being located in the target region, a state value of the virtual character to decrease at a first rate.

8. The method according to claim 1, further comprising:
   controlling, in response to the virtual character being located in the target region, a movement speed of the virtual character to change from the first movement speed of the virtual character in the neighboring region to the second movement speed of the virtual character in the target region.

9. The method according to claim 8, wherein the controlling the movement speed of the virtual character comprises:
   determining the second movement speed to be a product of the first movement speed and a friction coefficient that is associated with the target region.

10. The method according to claim 9, wherein a friction coefficient associated with the neighboring region is different from the friction coefficient associated with the target region.

11. The method according to claim 1, wherein
    the target region is provided with a collision box, and a distance between a bottom surface of the collision box and a horizontal plane in which the target region is located is less than a reference threshold; and
    the controlling the virtual character to enter the target region includes:
    controlling a three-dimensional (3D) model of the virtual character to have a first collision with the collision box;
    generating first collision information indicating that the 3D model of the virtual character enters the collision box; and
    determining, according to the first collision information, that the virtual character is located in the target region.

12. The method according to claim 11, further comprising:
    controlling the 3D model of the virtual character to have a second collision with the collision box;
    generating second collision information indicating that the 3D model of the virtual character exits the collision box; and
    determining, according to the second collision information, that the virtual character leaves the target region.

13. The method according to claim 2, wherein
    the virtual character is a target virtual character in an application controlled by a user input when the virtual character is player controlled.

14. The method according to claim 2, wherein
    the virtual character is in an application and is controlled by artificial intelligence (AI) when the virtual character is not player controlled.

15. The method according to claim 2, wherein the controlling the virtual character to sink comprises:
    controlling the virtual character to be still in the target region; and
    controlling the virtual character to sink based on a time of being still exceeding a threshold.

16. The method according to claim 1, wherein the picture of the virtual environment is from one of: (i) a first person perspective or a third person perspective of the virtual character, (ii) a perspective of another virtual character in the virtual environment, or (iii) a top perspective.

17. The method according to claim 1, wherein
    each of the neighboring region and the target region is one of a swamp, a quicksand region, a black hole, a vortex, or an undercurrent region; or the neighboring region is a region having an ordinary ground, and the target region is one of a swamp, a quicksand region, a black hole, a vortex, or an undercurrent region.

18. The method according to claim 1, wherein the neighboring region is a region having an ordinary ground, and the virtual character does not sink in the neighboring region.

19. An information processing apparatus, comprising:
processing circuitry configured to
  display a picture of a virtual environment, the picture including a target region located in the virtual environment, the target region being adjacent to a neighboring region in the virtual environment;
  control, in response to a first movement instruction, a virtual character to enter the target region from the neighboring region; and
  control the virtual character to sink in the target region based on (i) whether the virtual character moves within the target region and (ii) whether the virtual character is player controlled, wherein
a first movement speed of a movement type of the virtual character in the neighboring region is higher than a second movement speed of the movement type of the virtual character in the target region,
when the virtual character is player controlled, the virtual character is controlled to stop sinking in response to a second movement instruction, and
when the virtual character is not player controlled, the virtual character is controlled to sink until the virtual character is eliminated.

20. A non-transitory computer-readable storage medium storing instructions which when executed by at least one processor cause the at least one processor to perform:
  displaying a picture of a virtual environment, the picture including a target region located in the virtual environment, the target region being adjacent to a neighboring region in the virtual environment;
  in response to a first movement instruction, controlling a virtual character to enter the target region from the neighboring region; and
  controlling the virtual character to sink in the target region based on (i) whether the virtual character moves within the target region and (ii) whether the virtual character is player controlled, wherein
a first movement speed of the virtual character in the neighboring region is higher than a second movement speed of the virtual character in the target region,
when the virtual character is player controlled, the virtual character is controlled to stop sinking in response to a second movement instruction, and
when the virtual character is not player controlled, the virtual character is controlled to sink until the virtual character is eliminated.

* * * * *